US012689241B2

(12) United States Patent
Ko et al.

(10) Patent No.: US 12,689,241 B2
(45) Date of Patent: Jul. 21, 2026

(54) WIRELESS POWER TRANSMISSION DEVICE AND OPERATION METHOD THEREFOR

(71) Applicant: Samsung Electronics Co., Ltd.,
Suwon-si (KR)

(72) Inventors: Minbeom Ko, Suwon-si (KR); Sunryul Kim, Suwon-si (KR); Joonhong Kim, Suwon-si (KR); Jaehyun Park, Suwon-si (KR); Sungku Yeo, Suwon-si (KR); Chongmin Lee, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 19/198,786

(22) Filed: May 5, 2025

(65) Prior Publication Data

US 2025/0266720 A1 Aug. 21, 2025

Related U.S. Application Data

(63) Continuation of application No. PCT/KR2023/015857, filed on Oct. 13, 2023.

(30) Foreign Application Priority Data

Dec. 14, 2022 (KR) ........................ 10-2022-0174869

(51) Int. Cl.
*H02J 50/60* (2016.01)
*H02J 50/20* (2016.01)
(Continued)

(52) U.S. Cl.
CPC .............. *H02J 50/60* (2016.02); *H02J 50/20* (2016.02); *H02J 50/40* (2016.02); *H02J 50/80* (2016.02)

(58) Field of Classification Search
CPC .. H02J 50/20; H02J 50/40; H02J 50/60; H02J 50/80; H02J 50/90
See application file for complete search history.

(56) References Cited

U.S. PATENT DOCUMENTS 8,909,278 B2 12/2014 Rao et al.
10,938,241 B2 * 3/2021 Park ........................ H02J 50/12
(Continued)

FOREIGN PATENT DOCUMENTS

JP 2019-047197 A 3/2019
JP 2020-072492 A 5/2020
(Continued)

OTHER PUBLICATIONS

International Search Report dated Jan. 15, 2024, issued in International Application No. PCT/KR2023/015857.

*Primary Examiner* — Rexford N Barnie
*Assistant Examiner* — Joseph N Inge
(74) *Attorney, Agent, or Firm* — Jefferson IP Law, LLP

(57) ABSTRACT

A wireless power transmission device is provided. The wireless power transmission device includes a plurality of power transmission antennas, a plurality of sensing antennas, a power processing circuit memory storing one or more computer programs, and one or more processors communicatively coupled to the plurality of power transmission antennas, the plurality of sensing antennas, the power processing circuit, and the memory, wherein the one or more computer programs include computer-executable instructions that, when executed by the one or more processors individually or collectively, cause the wireless power transmission device to control the power processing circuit to transmit power to a first electronic device disposed in a first region among a plurality of regions through the plurality of power transmission antennas, transmit at least one first signal through the power processing unit using a first (Continued)

sensing antenna among the plurality of sensing antennas, receive at least one second signal through the power processing circuit, using a second sensing antenna among the plurality of sensing antennas, identify, whether an object exists in the first region among the plurality of regions based on the at least one first signal and the at least one second signal, identify a first stay duration during which the object stays in the first region, based on identifying that the object exists in the first region, identify a first cumulative RF radiation value of the wireless power transmission device for the first region during the first stay duration, and based on the first cumulative RF radiation value being equal to or greater than a first threshold for the first region, control the power processing circuit to adjust transmission output of the power to the first electronic device in the first region or to direct the power toward the first electronic device in the first region to a second electronic device in a second region different from the first region.

20 Claims, 17 Drawing Sheets

(51) Int. Cl.
H02J 50/40  (2016.01)
H02J 50/80  (2016.01)

(56)  References Cited

U.S. PATENT DOCUMENTS

| | | | | |
|---|---|---|---|---|
| 11,031,967 | B2 * | 6/2021 | Mueck | H04W 4/029 |
| 11,194,032 | B2 * | 12/2021 | Cetinoneri | G01S 13/003 |
| 2009/0163238 | A1 * | 6/2009 | Rao | H04W 52/244 |
| | | | | 455/522 |
| 2015/0355359 | A1 * | 12/2015 | Miyashita | H01F 38/14 |
| | | | | 324/207.16 |
| 2018/0069438 | A1 * | 3/2018 | Bit-Babik | H02J 50/20 |
| 2018/0152024 | A1 * | 5/2018 | Zeine | H01Q 23/00 |
| 2019/0252899 | A1 * | 8/2019 | Rahman | H02J 7/42 |
| 2020/0136435 | A1 * | 4/2020 | Mitomo | H02J 50/402 |
| 2020/0274400 | A1 * | 8/2020 | Yeo | H02J 50/402 |
| 2020/0403453 | A1 * | 12/2020 | Sherman | H02J 50/80 |
| 2021/0104919 | A1 * | 4/2021 | Leabman | H02J 7/80 |
| 2021/0376664 | A1 * | 12/2021 | Park | H02J 50/60 |
| 2023/0378817 | A1 * | 11/2023 | Johnston | H02J 50/60 |

FOREIGN PATENT DOCUMENTS

| | | | |
|---|---|---|---|
| KR | 10-2013-0068921 | A | 6/2013 |
| KR | 10-2015-0104650 | A | 9/2015 |
| KR | 10-2018-0124216 | A | 11/2018 |
| KR | 10-2019-0044430 | A | 4/2019 |
| KR | 10-2019-0059608 | A | 5/2019 |
| KR | 10-2019-0098632 | A | 8/2019 |
| WO | 2020/005961 | A1 | 1/2020 |

* cited by examiner

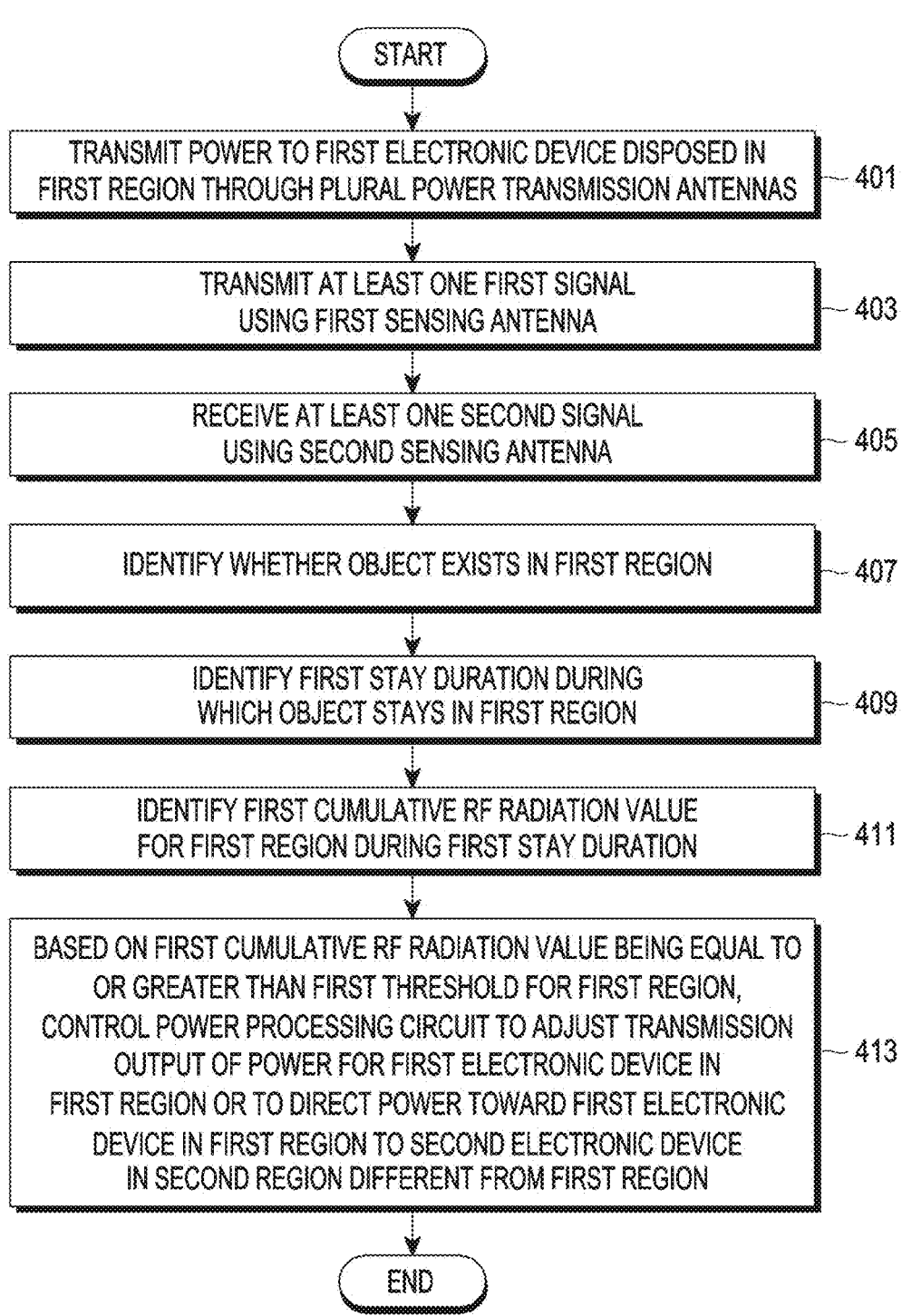

START

TRANSMIT POWER TO FIRST ELECTRONIC DEVICE DISPOSED IN FIRST REGION THROUGH PLURAL POWER TRANSMISSION ANTENNAS — 401

TRANSMIT AT LEAST ONE FIRST SIGNAL USING FIRST SENSING ANTENNA — 403

RECEIVE AT LEAST ONE SECOND SIGNAL USING SECOND SENSING ANTENNA — 405

IDENTIFY WHETHER OBJECT EXISTS IN FIRST REGION — 407

IDENTIFY FIRST STAY DURATION DURING WHICH OBJECT STAYS IN FIRST REGION — 409

IDENTIFY FIRST CUMULATIVE RF RADIATION VALUE FOR FIRST REGION DURING FIRST STAY DURATION — 411

BASED ON FIRST CUMULATIVE RF RADIATION VALUE BEING EQUAL TO OR GREATER THAN FIRST THRESHOLD FOR FIRST REGION, CONTROL POWER PROCESSING CIRCUIT TO ADJUST TRANSMISSION OUTPUT OF POWER FOR FIRST ELECTRONIC DEVICE IN FIRST REGION OR TO DIRECT POWER TOWARD FIRST ELECTRONIC DEVICE IN FIRST REGION TO SECOND ELECTRONIC DEVICE IN SECOND REGION DIFFERENT FROM FIRST REGION — 413

END

FIG. 4

WIRELESS POWER TRANSMISSION DEVICE AND OPERATION METHOD THEREFOR

CROSS-REFERENCE TO RELATED APPLICATION(S)

This application is a continuation application, claiming priority under 35 U.S.C. § 365(c), of an International application No. PCT/KR2023/015857, filed on Oct. 13, 2023, which is based on and claims the benefit of a Korean patent application number 10-2022-0174869, filed on Dec. 14, 2022, in the Korean Intellectual Property Office, the disclosure of which is incorporated by reference herein in its entirety.

BACKGROUND

1. Field

The disclosure relates to a wireless power transmission device and a method of operating the same.

2. Description of Related Art

Portable digital communication devices have become an essential element for many people living in the modern era. Consumers want to receive various high-quality services that they want anytime, anywhere. In addition, due to the recent development of Internet of things (IoT) technology, various sensors, home appliances, and communication devices in our lives are being networked. In order to operate these various sensors smoothly, a wireless power transmission system is needed.

For wireless power transmission, a magnetic induction scheme, a magnetic resonance scheme, and an electromagnetic wave scheme are available, and among them, the electromagnetic wave scheme is superior to the other schemes in long-distance power transmission.

Electromagnetic waves emitted from an electronic device may have a harmful effect on the human body, and various domestic and foreign organizations are trying to limit electromagnetic waves harmful to the human body. For example, an electronic device that emits electromagnetic waves should satisfy the specific absorption rate (SAR) or the maximum permissible emission (MPE). The SAR is a value that indicates how much electromagnetic waves emitted from an electronic device are absorbed by the human body. The MPE is a value that indicates the power density limit of electromagnetic waves radiated from an electronic device. Depending on the frequency of electromagnetic waves radiated by the electronic device, the SAR, the MPE, or both may be considered. Accordingly, the SAR and/or the MPE may also be referred to as a power exposure amount.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless power transmission device and operation method therefor.

Additional aspects will be set forth in part in the description which follows and, in part, will be apparent from the description, or may be learned by practice of the presented embodiments.

In accordance with an aspect of the disclosure, a wireless power transmission device is provided. The wireless power transmission device includes a plurality of power transmission antennas, a plurality of sensing antennas, a power processing circuit, memory storing one or more computer programs, and one or more processors communicatively coupled to the plurality of power transmission antennas, the plurality of sensing antennas, the power processing circuit, and the memory, wherein the one or more computer programs include computer-executable instructions that, when executed by the one or more processors individually or collectively, cause the wireless power transmission device to control the power processing circuit to transmit power to a first electronic device disposed in a first region among a plurality of regions included in a charging region of the wireless power transmission device through the plurality of power transmission antennas, to transmit at least one first signal through the power processing circuit, using a first sensing antenna among the plurality of sensing antennas, receive at least one second signal through the power processing circuit, using a second sensing antenna among the plurality of sensing antennas, identify whether an object exists in the first region among the plurality of regions, based on the at least one first signal and the at least one second signal, identify a first stay duration during which the object stays in the first region, based on identifying that the object exists in the first region, identify a first cumulative radio frequency (RF) radiation value of the wireless power transmission device for the first region during the first stay duration, based on the first cumulative RF radiation value being equal to or greater than a first threshold for the first region, control the power processing circuit to adjust transmission output of the power to the first electronic device in the first region or to direct the power toward the first electronic device in the first region to a second electronic device in a second region different from the first region.

In accordance with another aspect of the disclosure, a method of operating a wireless power transmission device is provided. The method includes controlling a power processing circuit of the wireless power transmission device to transmit power to a first electronic device disposed in a first region among a plurality of regions included in a charging region of the wireless power transmission device through a plurality of power transmission antennas of the wireless power transmission device, transmitting at least one first signal through the power processing circuit, using a first sensing antenna among a plurality of sensing antennas of the wireless power transmission device, receiving at least one second signal through the power processing circuit, using a second sensing antenna among the plurality of sensing antennas, identifying whether an object exists in the first region among the plurality of regions, based on the at least one first signal and the at least one second signal, identifying a first stay duration during which the object stays in the first region, based on identifying that the object exists in the first region, identifying a first cumulative RF radiation value of the wireless power transmission device for the first region during the first stay duration, and based on the first cumulative RF radiation value being equal to or greater than a first threshold for the first region, controlling the power processing circuit to adjust transmission output of the power to the first electronic device in the first region or to direct the power toward the first electronic device in the first region to a second electronic device in a second region different from the first region.

In accordance with another aspect of the disclosure, one or more computer-readable storage media storing one or more computer programs including computer-executable instructions that, when executed by one or more processors of a wireless power transmission device individually or collectively, cause the wireless power transmission device to perform operations is provided The one operations include controlling a power processing circuit of the wireless power transmission device to transmit power to a first electronic device disposed in a first region among a plurality of regions included in a charging region of the wireless power transmission device through a plurality of power transmission antennas of the wireless power transmission device, transmitting at least one first signal through the power processing circuit, using a first sensing antenna among a plurality of sensing antennas of the wireless power transmission device, receiving at least one second signal through the power processing circuit, using a second sensing antenna among the plurality of sensing antennas, identifying whether the object exists in the first region among the plurality of regions, based on the at least one first signal and the at least one second signal, identifying a first stay duration during which the object stays in the first region, based on identifying that the object exists in the first region, identifying a first cumulative RF radiation value of the wireless power transmission device for the first region during the first stay duration, and, based on the first cumulative RF radiation value being equal to or greater than a first threshold for the first region, controlling the power processing circuit to adjust transmission output of the power to the first electronic device in the first region or to direct the power toward the first electronic device in the first region to a second electronic device in a second region different from the first region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating a method of operating a wireless power transmission device according to an embodiment of the disclosure;

4

Figures 6A, 6B, 6C:
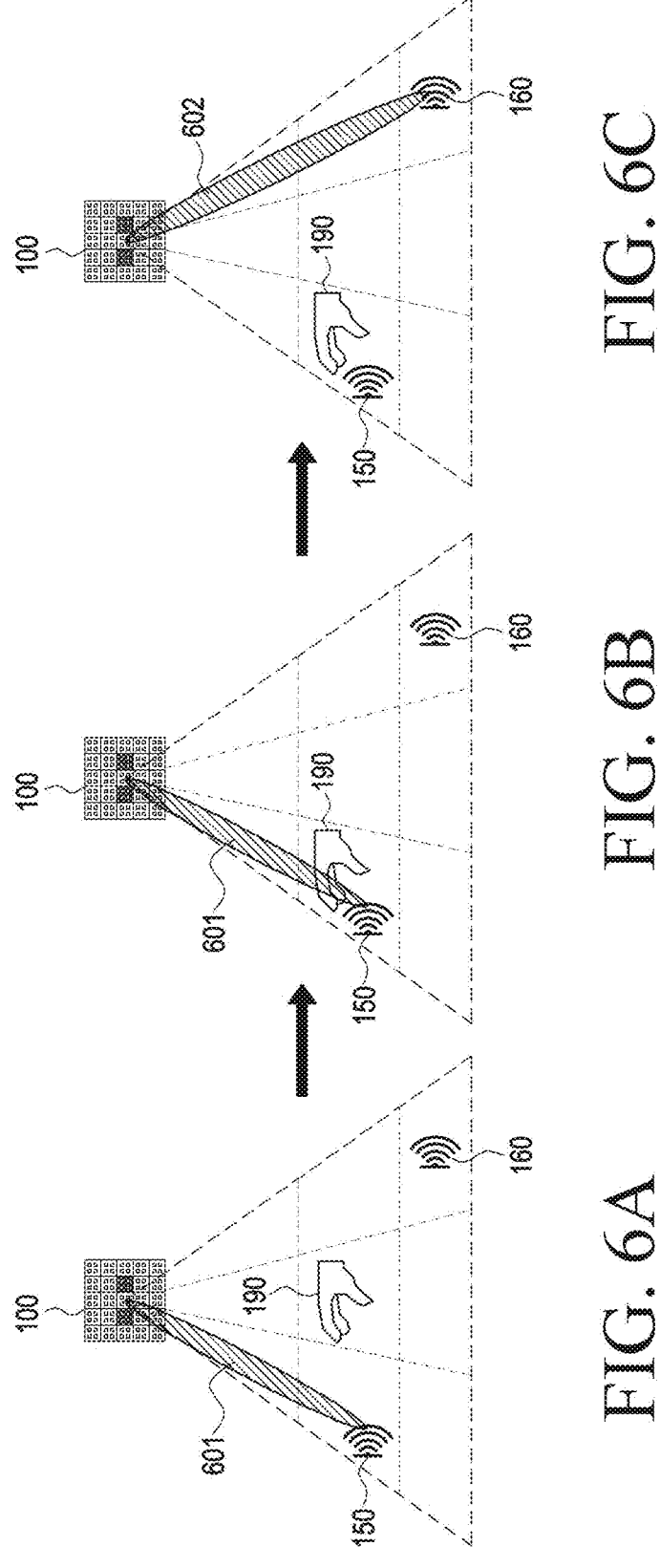
Figure 7:
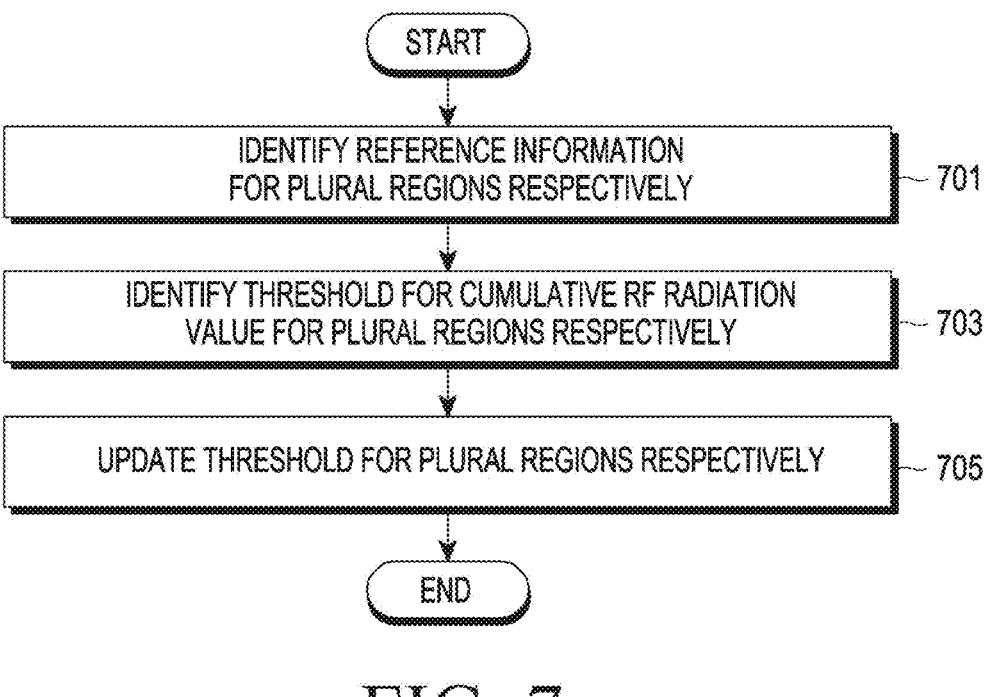
Figure 8:
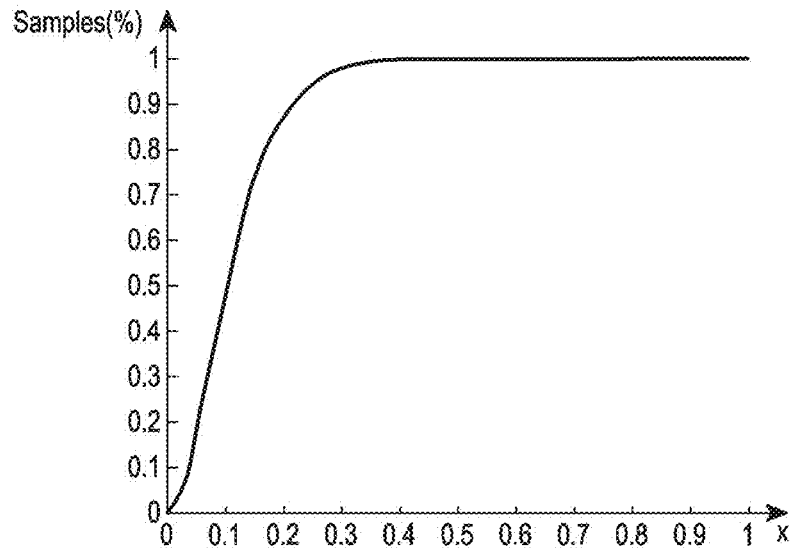
Figure 9:
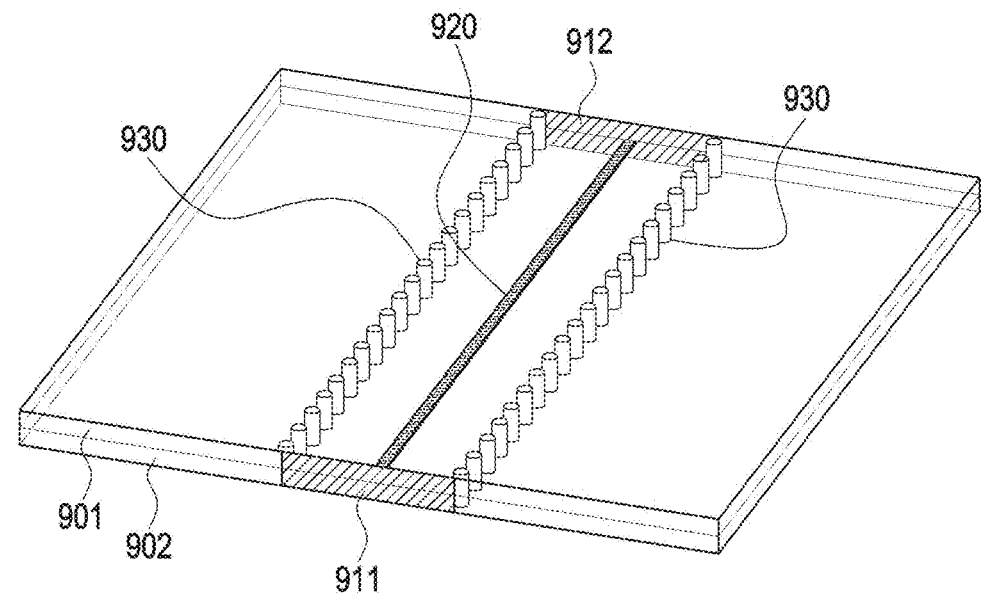
Figure 10:
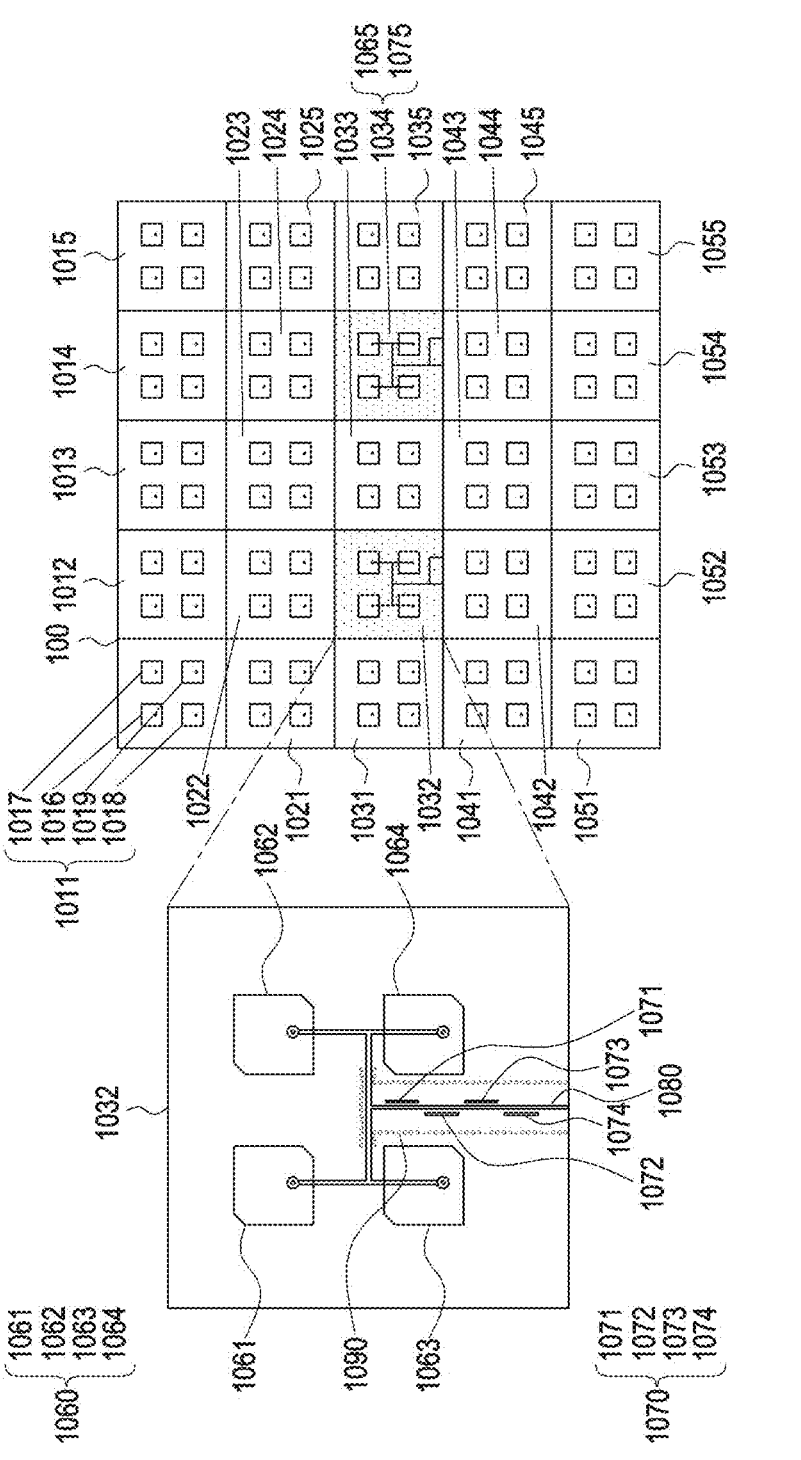
Figure 11:
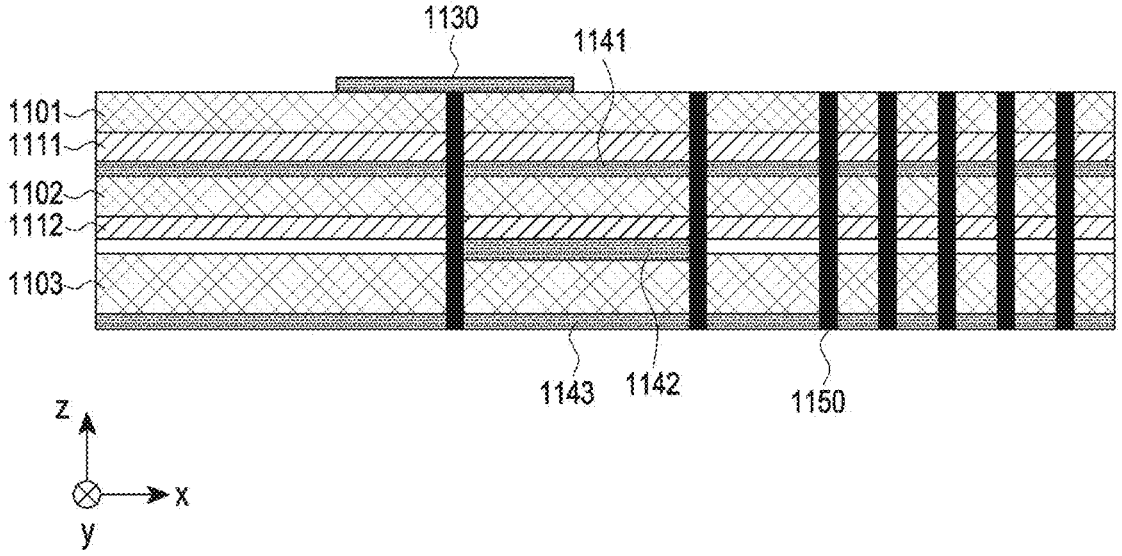
Figure 12:
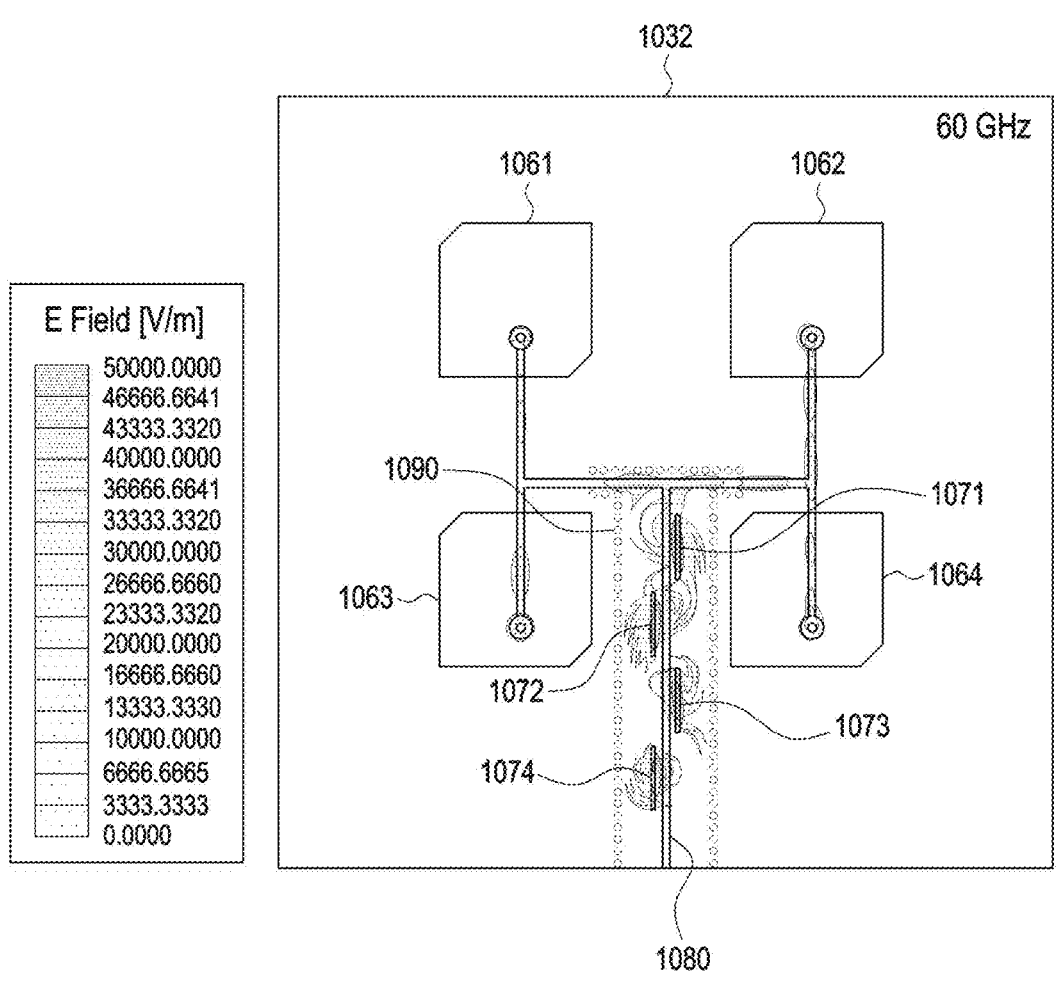
Figure 13:
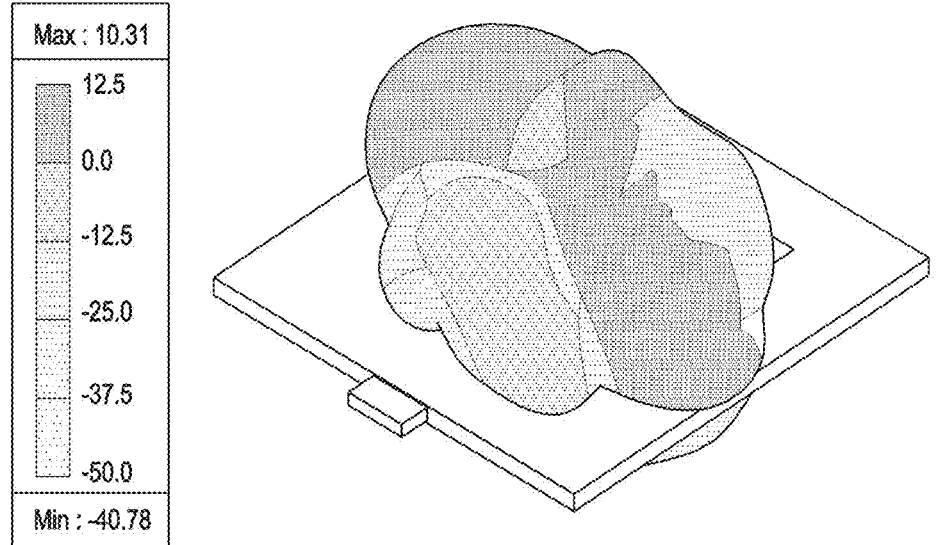
Figure 14:
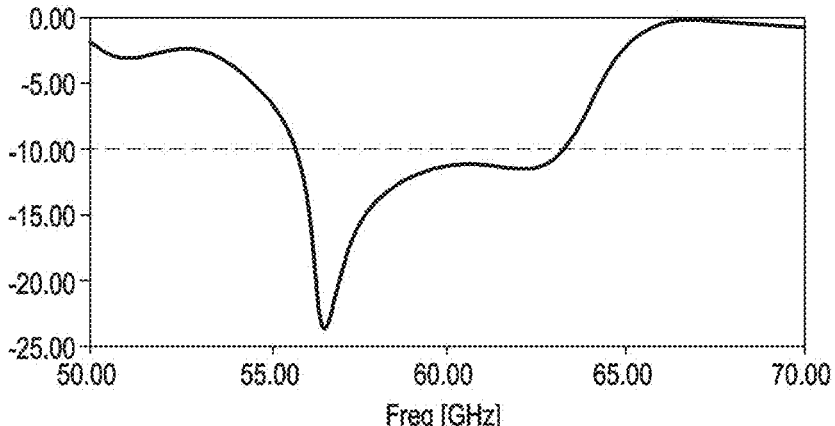
Figure 15:
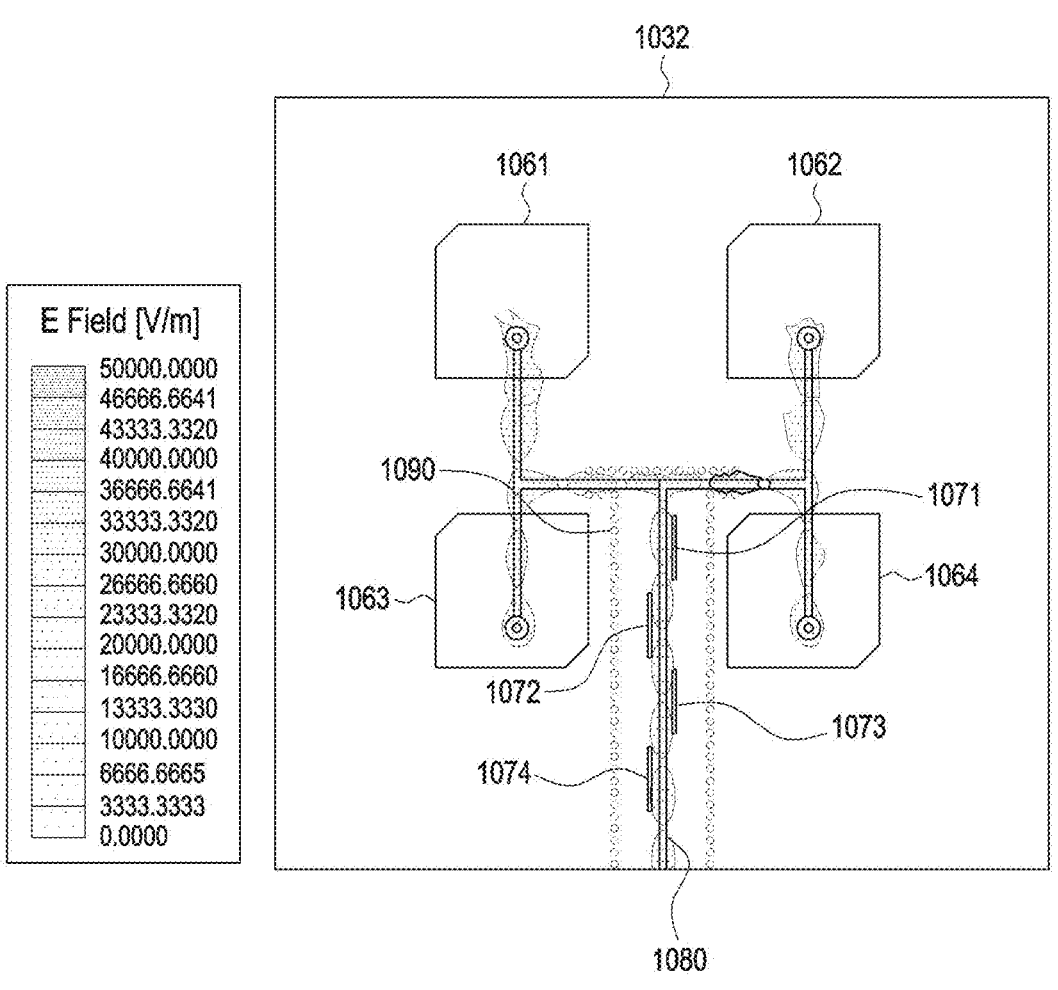
Figure 16:
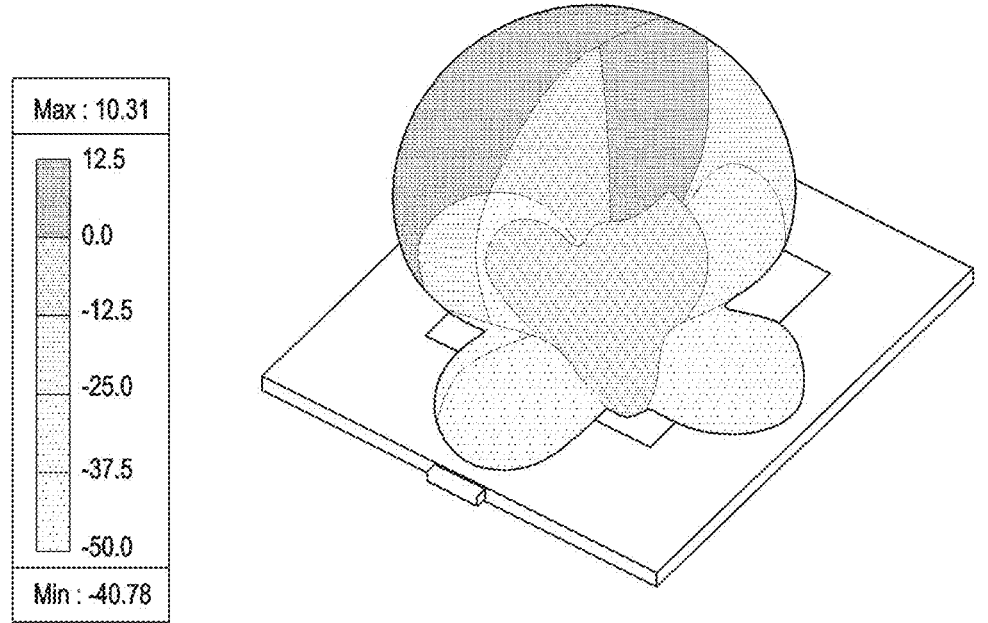
Figure 17:
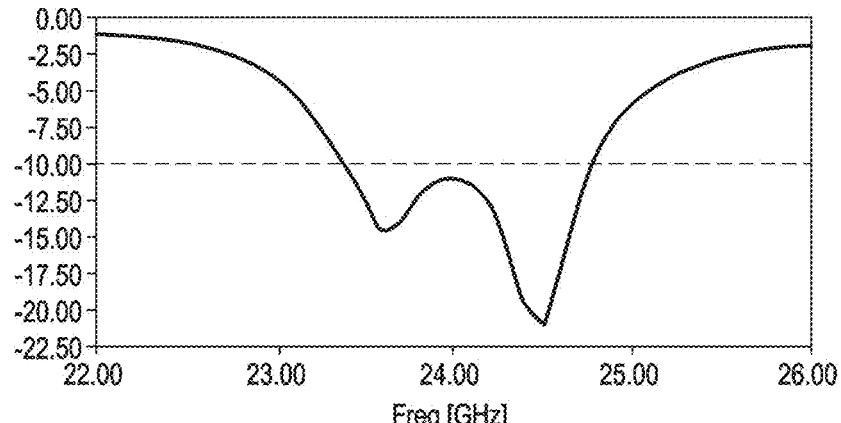

FIGS. 6A, 6B, and 6C are diagrams illustrating an operation of a wireless power transmission device according to an embodiment of the disclosure;

FIG. 7 is a flowchart illustrating a method of operating a wireless power transmission device according to an embodiment of the disclosure;

FIG. 8 is a diagram illustrating an operation of a wireless power transmission device according to an embodiment of the disclosure;

FIG. 9 is a diagram illustrating an orthogonal mode power feeding structure in a wireless power transmission device according to an embodiment of the disclosure;

FIG. 10 is a diagram illustrating a power transmission antenna and a sensing antenna in a wireless power transmission device according to an embodiment the disclosure;

FIG. 11 is a diagram illustrating an antenna structure in a wireless power transmission device according to an embodiment of the disclosure;

FIG. 12 is a diagram illustrating an operation of an orthogonal mode power feeding structure in a wireless power transmission device according to an embodiment of the disclosure;

FIG. 13 is a diagram illustrating a radiation pattern of a wireless power transmission device according to an embodiment of the disclosure;

FIG. 14 is a graph illustrating reflection coefficients of a wireless power transmission device according to an embodiment of the disclosure;

FIG. 15 is a diagram illustrating an operation of an orthogonal mode power feeding structure in a wireless power transmission device according to an embodiment of the disclosure;

FIG. 16 is a diagram illustrating a radiation pattern of a wireless power transmission device according to an embodiment of the disclosure; and FIG. 17 is a graph illustrating reflection coefficients of a wireless power transmission device according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
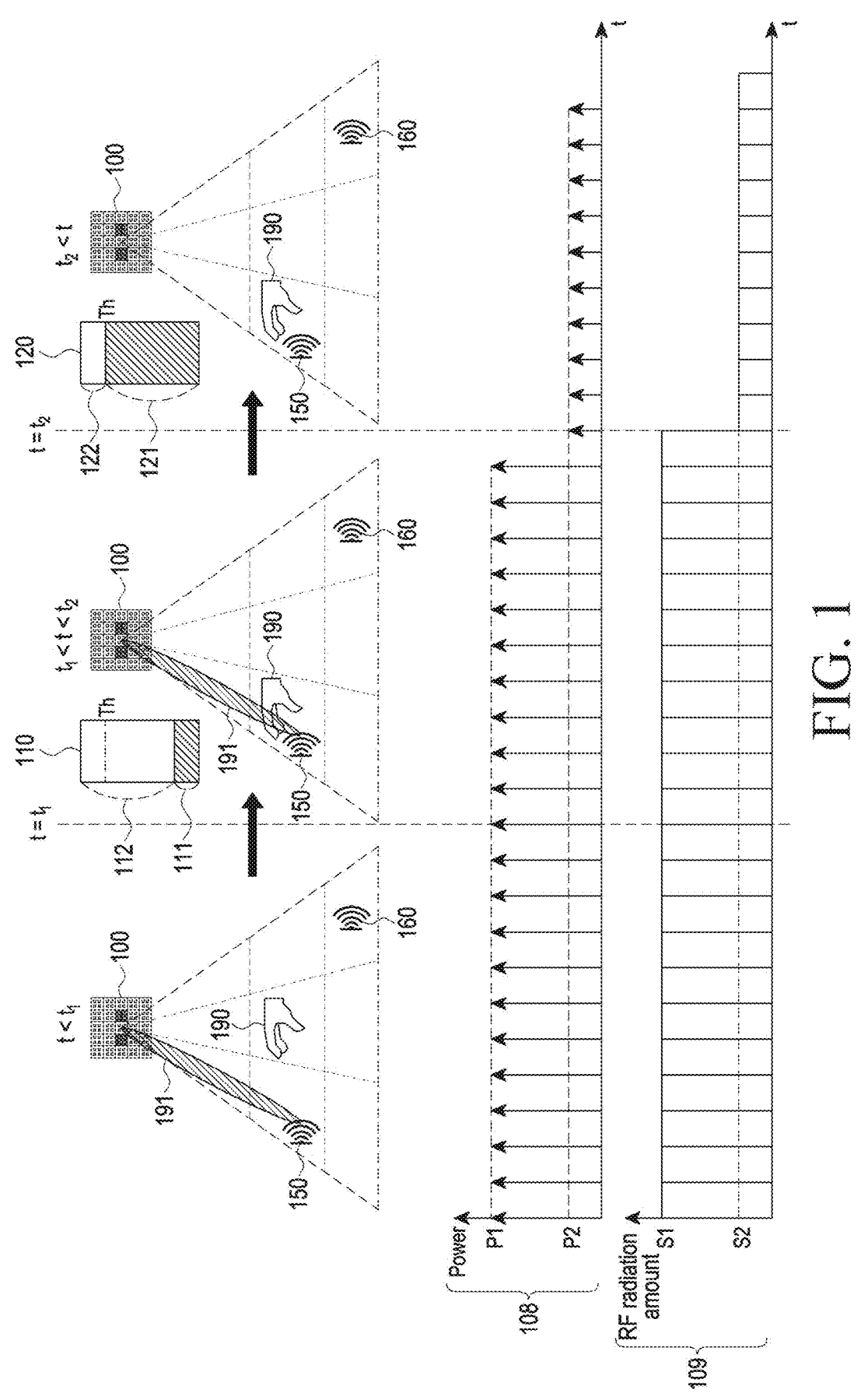
FIG. 1 is a diagram illustrating an operation of a wireless power transmission device included in a system according to an embodiment of the disclosure.

FIG. 1 is a diagram illustrating an operation of a wireless power transmission device included in a system according to an embodiment of the disclosure.

In the disclosure, when it is said that a wireless power transmission device 100 performs a specific operation, for example, this may mean that a processor included in the wireless power transmission device 100 performs the specific operation or controls other hardware to perform the specific operation. Alternatively, when it is said that the wireless power transmission device 100 performs a specific operation, for example, this may mean that the processor or other hardware performs the specific operation by executing instructions stored in memory included in the wireless power transmission device 100.

Referring to FIG. 1, the wireless power transmission device 100 may wirelessly transmit power to at least one electronic device 150 and 160. As long as it wirelessly receives power, the at least one electronic device 150 and 160 is not limited. In an embodiment, the wireless power transmission device 100 may include a plurality of power transmission antennas. For example, the plurality of power transmission antennas may be implemented as patch antennas, but the method of implementing the plurality of power transmission antennas is not limited. The plurality of power transmission antennas may be arranged in the form of an array, and the arrangement of the plurality of power transmission antennas is not limited. As long as each of them is an antenna capable of generating RF waves, the plurality of power transmission antennas are not limited. At least one of the amplitude or phase of an RF wave generated from the plurality of power transmission antennas may be adjusted by the wireless power transmission device 100 (e.g., a power processing circuit of the wireless power transmission device 100). For convenience of description, an RF wave respectively generated from the plurality of power transmission antennas will be referred to as a sub-RF wave.

In an embodiment, the wireless power transmission device 100 may adjust at least one of the amplitude or phase of respective sub-RF waves generated from the plurality of power transmission antennas. For example, the wireless power transmission device 100 may control the power processing circuit of the wireless power transmission device 100 to adjust at least one of the amplitude or phase of respective sub-RF waves generated from the plurality of power transmission antennas. The sub-RF waves may interfere with each other. For example, the sub-RF waves may constructively interfere with each other at one point, and destructively interfere with each other at another point. The wireless power transmission device 100 according to an embodiment may adjust at least one of the amplitude or phase of respective sub-RF waves generated from the plurality of power transmission antennas, so that the sub-RF waves may constructively interfere with each other at a first point. The wireless power transmission device 100 may adjust at least one of the amplitude or phase of respective sub-RF waves by adjusting at least one of the phase or amplitude of an electrical signal respectively input to the plurality of power transmission antennas.

For example, referring to FIG. 1, the wireless power transmission device 100 may determine that a first electronic device 150 is located at the first point in a first region. The location of the first electronic device 150 may be, for example, a point at which a power reception antenna of the first electronic device 150 is located. The wireless power transmission device 100 may determine the location of the first electronic device 150 in various ways. To allow the first electronic device 150 to wirelessly receive power with high transmission efficiency, sub-RF waves should constructively interfere with each other at the first point in the first region. Accordingly, the wireless power transmission device 100 may control the plurality of power transmission antennas so that the sub-RF waves constructively interfere with each other at the first point in the first region. Controlling the plurality of power transmission antennas may mean controlling the magnitudes of electrical signals input to the plurality of power transmission antennas or controlling the phases or delays of signals input to the plurality of power transmission antennas. Beamforming, which is a technology for controlling RF waves to constructively interfere with each other at a specific point, will be easily understood by those skilled in the art. In addition, it will be easily understood by those skilled in the art that the type of beamforming used in the disclosure is not limited.

Accordingly, an RF wave formed by interference of sub-RF waves may have a maximum amplitude at the first point in the first region, and thus, the first electronic device 150 may receive wireless power with high efficiency. Meanwhile, the wireless power transmission device 100 may also detect that a second electronic device 160 is disposed at a second point in a second region. The wireless power transmission device 100 may control the plurality of power transmission antennas so that sub-RF waves constructively interfere with each other at the second point in the second region in order to charge the second electronic device 160.

As described above, the wireless power transmission device 100 determines the location of the at least one electronic device 150 and 160 and cause sub-RF waves to constructively interfere with each other at the determined location, thereby performing wireless charging with high transmission efficiency.

According to an embodiment, referring to FIG. 1, the wireless power transmission device 100 may determine the location of an object 190 (e.g., a human body). For example, the wireless power transmission device 100 may determine the location of the object 190 based on a radar signal. The wireless power transmission device 100 may transmit a radar signal, receive a radar signal reflected from the object, and determine the location of the object 190 based on the transmitted signal and the received signal. According to an embodiment, the wireless power transmission device 100 may determine the location of the object 190 using a camera. For example, the wireless power transmission device 100 may determine the location of the object 190 based on an image obtained through the camera. According to an embodiment, the wireless power transmission device 100 may determine the location of the object 190 using a temperature sensor. For example, the wireless power transmission device 100 may determine the location of the object 190 based on a sensing value obtained through the temperature sensor.

FIG. 1 illustrates an embodiment in which, while the wireless power transmission device 100 is transmitting power to the first electronic device 150, the object 190 enters the first region where the first electronic device 150 is located at a first time point t1, and the transmission output of power from the wireless power transmission device 100 to the first electronic device 150 is adjusted from a second time point t2. FIG. 1 includes a graph 108 illustrating transmission power over time according to an embodiment. The "transmission power" may be the magnitude of power transmitted from the wireless power transmission device 100 to a specific region (e.g., the first region where the first electronic device 150 is located). FIG. 1 includes a graph 109 illustrating amounts of RF radiation over time according to an embodiment. An "amount of RF radiation" may be a power exposure amount (e.g., the SAR and/or the MPE) in a specific region (e.g., the first region where the first electronic device 150 is located). Based on the graph 109 of the amounts of RF radiation over time, a cumulative RF radiation value (or a time average value of the cumulative RF radiation value) may be identified. The cumulative RF radiation value or the time average value of the cumulative RF radiation value should meet a reference power exposure amount (e.g., an SAR and/or MPE reference).

According to an embodiment, referring to FIG. 1, the wireless power transmission device 100 may transmit first power 191 to the first electronic device 150 located at the first point in the first region before the first time point t1. The first electronic device 150 may receive the first power 191 from the wireless power transmission device 100 before the first time point t1. For example, referring to the graph 108 of transmission power over time in FIG. 1, the wireless power transmission device 100 may transmit power with a first transmission power P1 to the first electronic device 150 during t<t1. Although the graph 108 of transmission power over time in FIG. 1 illustrates that power with the same transmission power (e.g., the first transmission power P1) is transmitted during t<t1, this is for convenience of description, and the transmission power of power transmitted during t<t1 may be different depending on time points. For example, referring to the graph 109 of the amounts of RF radiation over time in FIG. 1, as power with the first transmission power P1 is transmitted during t<t1, the amount of RF radiation over time in the first region where the first electronic device 150 is located may be identified as a first amount of RF radiation S1. Although in the graph 109 of the amounts of RF radiation over time in FIG. 1, the amount of RF radiation over time in the first region where the first electronic device 150 is located is shown as being maintained as the first amount of RF radiation S1, this is for convenience of description, and as the transmission power of power transmitted during t<t1 changes, the amount of RF radiation over time in the first region may change. As it is identified that the object 190 (e.g., a human body) does not exist in the first region where the first electronic device 150 is located, the wireless power transmission device 100 may transmit the first power 191 to the first electronic device 150 during t<t1.

According to an embodiment, referring to FIG. 1, the wireless power transmission device 100 may identify the object 190 in the first region where the first electronic device 150 is located at the first time point t1. The wireless power transmission device 100 may identify that the object 190 enters the first region at the first time point t1. The wireless power transmission device 100 may identify the object 190 using a radar signal, which will be described later in more detail. The wireless power transmission device 100 may identify that the object 190 (e.g., a human body) exists in the first region where the first electronic device 150 is located at the first time point t1, and then continuously transmit the first power 191 to the first electronic device 150. The wireless power transmission device 100 may continuously transmit the first power 191 to the first electronic device 150 in the first region from the first time point t1 at which the object 190 (e.g., a human body) is identified as existing in the first region until the second time point t2, because the cumulative RF radiation value or the time average value of the cumulative RF radiation value in the first region satisfies the reference power exposure amount (e.g., the SAR and/or MPE reference). For example, in FIG. 1, a first graph 110 illustrating a cumulative RF radiation value in the first region may represent a consumed amount of RF radiation 111 in the first region and the remaining amount of RF radiation 112 in the first region after the first time point t1. The wireless power transmission device 100 may identify a threshold (e.g., "Th" in the first graph 110) for the cumulative RF radiation value (or the time average value of the cumulative RF radiation value) in the first region. Based on the consumed amount of RF radiation 111 in the first region being less than the threshold "Th" for the cumulative RF radiation value (or the time average value of the cumulative RF radiation value) in the first region during t1<t<t2, the wireless power transmission device 100 may continue to transmit the first power 191 to the first electronic device 150 in the first region.

In FIG. 1, a second graph 120 illustrating a cumulative RF radiation value in the first region may represent a consumed amount of RF radiation 121 in the first region and the remaining amount of RF radiation 122 in the first region at the second time point t2. According to an embodiment, the wireless power transmission device 100 may identify that the consumed amount of RF radiation 121 in the first region has reached the threshold "Th" for the cumulative RF radiation value in the first region or the time average value of the cumulative RF radiation value at the second time point t2. The wireless power transmission device 100 may adjust the transmission output of power to the first electronic device 150 in the first region, based on the consumed amount of RF radiation 121 in the first region being equal to or greater than the threshold "Th" for the cumulative RF radiation value or the time average of the cumulative RF radiation value in the first region at the second time point t2. The operation of adjusting the transmission output of power may include an operation of lowering the transmission power of transmitted power or an operation of stopping the power transmission. For example, the wireless power transmission device 100 may transmit power with a second transmission power P2 to the first electronic device 150 from the second time point t2 in order to meet the reference power exposure amount (e.g., the SAR and/or MPE reference). The second transmission power P2 may be determined by the reference power exposure amount (e.g., the SAR and/or MPE reference). Alternatively, the wireless power transmission device 100 may stop transmitting power to the first electronic device 150 in the first region at the second time point t2.

According to the embodiment of FIG. 1, as the object 190 approaches a region to which power is transmitted, the wireless power transmission device 100 may continue to transmit power as long as the reference power exposure amount (e.g., the SAR and/or MPE reference) is met, and may adjust the transmission power of transmitted power, when the threshold of the reference power exposure amount (e.g., the SAR and/or MPE reference) is reached. In the embodiment of FIG. 1, the operation of adjusting the transmission power of transmitted power may be replaced with an operation of transmitting power to a region other than the region to which power was transmitted. For example, the wireless power transmission device 100 may transmit power toward the first electronic device 150 in the first region before the second time point t2, and toward the second electronic device 160 in the second region different from the first region from the second time point t2. The operation of controlling the transmission power of transmitted power and the operation of transmitting power toward the second region different from the first region will be described later in more detail.

Figure 2:
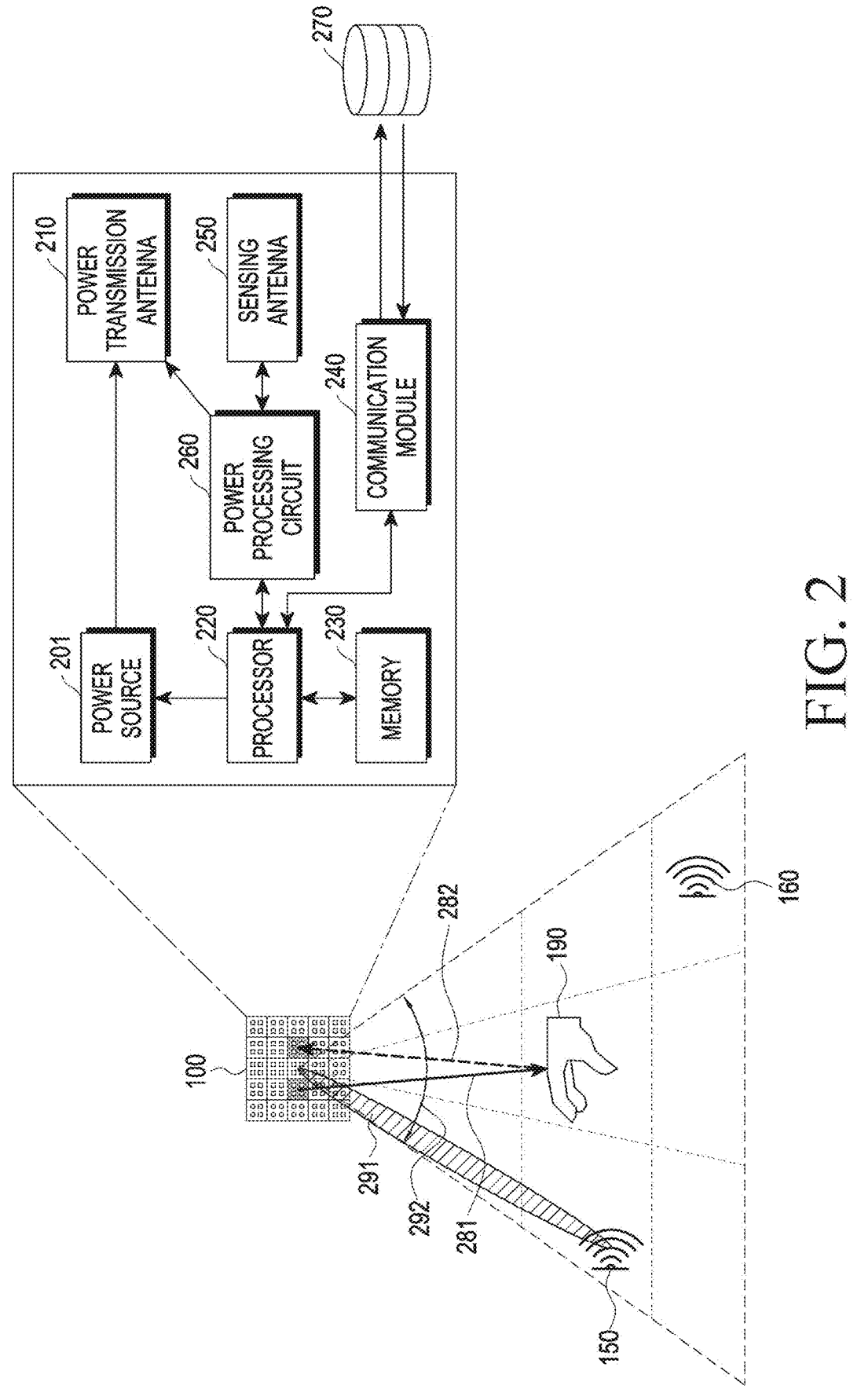
FIG. 2 is a block diagram illustrating a wireless power transmission device according to an embodiment of the disclosure.

FIG. 2 is a block diagram illustrating a wireless power transmission device according to an embodiment of the disclosure.

Referring to FIG. 2, the wireless power transmission device 100 may include a power source 201, a power transmission antenna 210, a processor 220, memory 230, a communication module 240, a sensing antenna 250, and/or a power processing circuit 260. The number of antennas (e.g., 1011, 1012, 1013, 1014, 1015, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1065 in FIG. 10) included in the power transmission antenna 210 is not limited. The number of antennas (e.g., 1070, 1071, 1072, 1073, 1074, and 1075 in FIG. 10) included in the sensing antenna 250 is not limited. The plurality of power transmission antennas 210 and the plurality of sensing antennas 250 will be described later in more detail with reference to FIGS. 9, 10, and 11. Hereinafter, the power transmission antenna 210 may be a power transmission antenna (e.g., patch antennas) disclosed in FIG. 10. Hereinafter, the sensing antenna 250 may be a sensing antenna (e.g., a slot antenna) disclosed in FIG. 10.

The power source 201 may provide power for transmission to the power transmission antenna 210. The power source 201 may provide, for example, direct current (DC) power, and in this case, an inverter (not shown) that converts the DC power into alternating current (AC) power and transmits it to the power transmission antenna 210 may be further included in the wireless power transmission device 100. In another embodiment, the power source 201 may provide AC power to the power transmission antenna 210.

The power transmission antenna 210 may include a plurality of patch antennas. For example, a plurality of patch antennas as illustrated in FIGS. 1 and 2 may be included in the power transmission antenna 210. The number or arrangement of the patch antennas is not limited. The power transmission antenna 210 may form an RF wave using power provided from the power source 201. The power transmission antenna 210 may form an RF wave in a specific direction under the control of the processor 220. Forming an RF wave in a specific direction may mean controlling at least one of the amplitudes or phases of sub-RF waves so that the sub-RF waves cause constructive interference at a point in the specific direction. For example, the processor 220 may control at least one of the amplitudes or phases of the sub-RF waves by controlling the power processing circuit 260 connected to the power transmission antenna 210. The power processing circuit 260 may include a phase shifter, an attenuator, or an amplifier. Alternatively, the power processing circuit 260 may include an in-phase/quadrature (I/Q) signal generation circuit and an I/Q signal amplifier. The processor 220 may control at least one of the amplitudes or phases of the sub-RF waves by controlling the power processing circuit 260 to adjust at least one of the phase or amplitude of an electrical signal respectively input to the plurality of patch antennas included in the power transmission antenna 210.

The processor 220 may determine a direction in which the first electronic device 150 is located, and determine a direction in which RF waves are formed at least based on the determined direction. That is, the processor 220 may control the patch antennas of the power transmission antenna 210 (or the power processing circuit 260) that generates sub-RF waves so that the sub-RF waves cause constructive interference at at least one point in the determined direction. For example, the processor 220 may control at least one of the amplitude or phase of a sub-RF wave respectively generated from the patch antennas by controlling the patch antennas or the power processing circuit 260 connected to the patch antennas. For example, in FIG. 1, the processor 220 may transmit first power 291 to the first electronic device 150 located at the first point in the first region by controlling the power transmission antenna 210 or the power processing circuit 260 connected to the power transmission antenna 210. The wireless power transmission device 100 may wirelessly transmit power within a transmission range 292. Although the transmission range 292 is shown in FIG. 2 as having a two-dimensional angle, this is for convenience of description, and the transmission range may be a concept including a three-dimensional direction, for example, θ and φ values in a spherical coordinate system and a distance.

The processor 220 may use signals (e.g., radar signals) transmitted to and received from the sensing antenna 250 to identify a direction in which the object 190 is located, a distance to the object 190, and/or a stay duration of the object 190 in a specific region.

Although the sensing antenna 250 is shown as one in FIG. 2, this is for convenience of description, and the number of sensing antennas 250 included in the wireless power transmission device 100 is not limited. The sensing antenna 250 may include at least one slot antenna. A group of at least one slot antenna may be defined as one sensing antenna 250. The number of slot antennas included in the sensing antenna 250 is not limited.

According to an embodiment, the sensing antenna 250 may be a mono type capable of transmitting or receiving. The wireless power transmission device 100 may include a plurality of mono-type sensing antennas 250. Although one sensing antenna for transmitting and one sensing antenna for receiving are illustrated in FIG. 2, this is only for convenience of description, and the number and arrangement of sensing antennas 250 are not limited.

For example, in FIG. 2, the wireless power transmission device 100 may transmit at least one first signal 281 using a first sensing antenna (e.g., a sensing antenna for transmission) among the sensing antennas 250, and receive at least one second signal 282 using a second sensing antenna (e.g., a sensing antenna for reception) among the sensing antennas 250. For example, the wireless power transmission device 100 may transmit the at least one first signal 281 using the first sensing antenna (e.g., the sensing antenna for transmission) among the sensing antennas 250 through the power processing circuit 260. For example, the wireless power transmission device 100 may receive the at least one second signal 282, using the second sensing antenna (e.g., the sensing antenna for reception) among the sensing antennas 250 through the power processing circuit 260. The at least one second signal 282 may be a signal in which the at least one first signal 281 is reflected from an object (e.g., the object 190). The wireless power transmission device 100 may identify the object 190 based on the at least one first signal 281 and the at least one second signal 282. The wireless power transmission device 100 may identify the distance between the object 190 and the wireless power transmission device 100, the angle between the object 190 and the wireless power transmission device 100, and/or the stay duration of the object 190 in the specific region, based on the at least one first signal 281 and the at least one second signal 282.

The processor 220 may determine a relative direction of the object 190, the distance to the object 190, and/or the stay duration of the object 190 by using, for example, a program or algorithm stored in the memory 230, which is capable of determining a direction, a distance, and/or a stay duration. The wireless power transmission device 100 or the processor 220 may determine the relative direction of the object 190, the distance to the object 190, and/or the stay duration of the object 190 in various ways. For example, the relative direction of the object 190, the distance to the object 190, and/or the stay duration of the object 190 may be determined in various ways such as time difference of arrival (TDOA) or frequency difference of arrival (FDOA), and the type of the program or algorithm used by the processor 220 is not limited.

According to an embodiment, the sensing antenna 250 may be a bi-type capable of transmitting and receiving.

The processor 220 may perform communication with a server 270 through the communication module 240. An operation of the processor 220 may be performed in the server 270. For example, when a first operation may be performed by the processor 220 of the wireless power transmission device 100, the first operation may also be performed by the server 270. Therefore, the first operation may be performed by the processor 220 of the wireless power transmission device 100 and/or the server 270. For example, the processor 220 of the wireless power transmission device 100 may directly perform the first operation. The wireless power transmission device 100 (e.g., the processor 220) may transmit information required for performing the first operation to the server 270 through the communication module 240. The server 270 may receive the information required for performing the first operation and perform the first operation based on the received information. The server 270 may transmit the result of performing the first operation to the wireless power transmission device 100. The wireless power transmission device 100 (e.g., the processor 220) may identify the result of performing the first operation by the server 270.

Figure 3A:
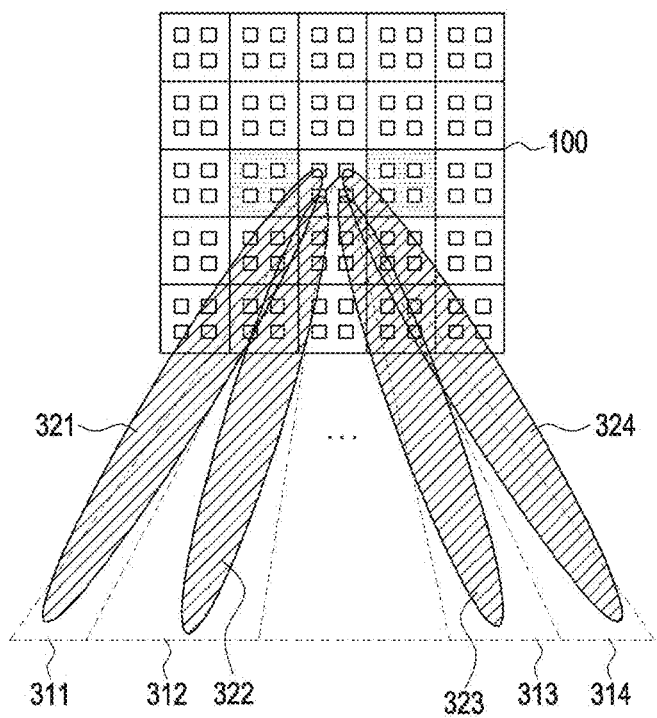
FIGS. 3A and 3B are diagrams illustrating a plurality of regions included in a charging region of a wireless power transmission device according to an embodiment of the disclosure.
Figure 3B:
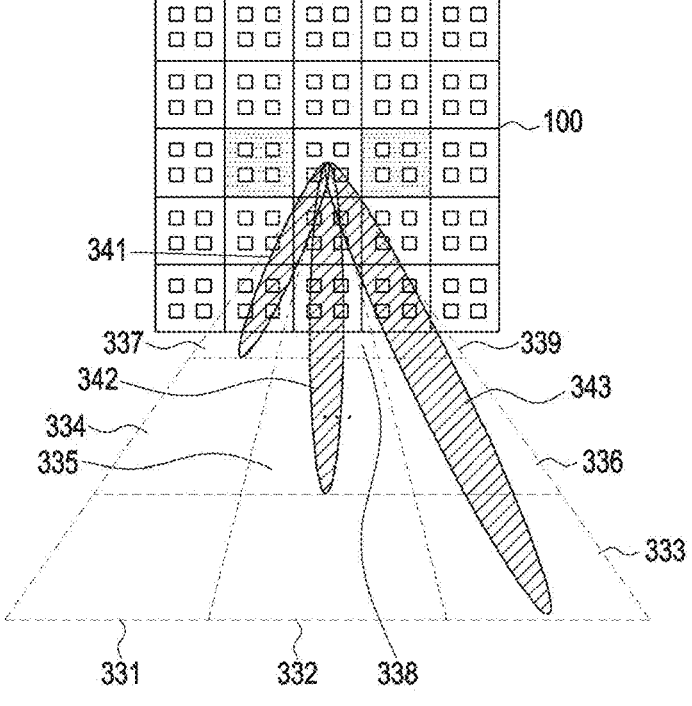

FIGS. 3A and 3B are diagrams illustrating a plurality of regions included in a charging region of a wireless power transmission device according to an embodiment of the disclosure.

The charging region of the wireless power transmission device 100 may be a region to which power is transmittable by the wireless power transmission device 100. The charging region of the wireless power transmission device 100 may be determined by a transmission range (e.g., the transmission range 292 of FIG. 2) of the wireless power transmission device 100. The wireless power transmission device 100 may transmit power according to the limitations of the transmission range (e.g., a three-dimensional direction, for example, $\theta$ and $\phi$ values in the spherical coordinate system, and a transmission distance). The transmission range of the wireless power transmission device 100 is not limited. In FIG. 3A, a charging region based on far field beamforming may be described. For example, FIG. 3A may illustrate a charging region at a relatively far distance from the wireless power transmission device 100. In FIG. 3B, a charging region based on near field focusing may be described. For example, FIG. 3B may illustrate a charging region at a relatively short distance from the wireless power transmission device 100.

Referring to FIG. 3A, the charging region of the wireless power transmission device 100 may include a plurality of regions 311, 312, 313, and 314. In FIG. 3A, the plurality of regions 311, 312, 313, and 314 are shown as being separated two-dimensionally, but this is for convenience of description. The plurality of regions 311, 312, 313, and 314 of FIG. 3A may be distinguished by three-dimensional directions, for example, according to $\theta$ and $\phi$ values in the spherical coordinate system, by far field beamforming. For example, the plurality of regions 311, 312, 313, and 314 of FIG. 3A may be distinguished by directions (e.g., $\theta$ and $\phi$ values) in which power is transmitted from the wireless power transmission device 100. For example, the wireless power transmission device 100 may transmit first power 321 in a first direction toward the first region 311. The wireless power transmission device 100 may transmit second power 322 in a second direction towards the second region 312. The wireless power transmission device 100 may transmit third power 323 in a third direction towards the third region 313. The wireless power transmission device 100 may transmit fourth power 324 in a fourth direction towards the fourth region 314. Although FIG. 3A illustrates four directions and four regions, this is for convenience of description, and the number of the regions 311, 312, 313, and 314 may be determined depending on the performance of the wireless power transmission device 100 (e.g., the number of directions in which power is transmitted and which are controllable by the wireless power transmission device 100).

Referring to FIG. 3B, the charging region of the wireless power transmission device 100 may include a plurality of regions 331, 332, 333, 334, 335, 336, 337, 338, and 339. In FIG. 3B, the plurality of regions 331, 332, 333, 334, 335, 336, 337, 338, and 339 are shown as being divided in a two-dimensional grid, but this is for convenience of explanation, and the plurality of regions 331, 332, 333, 334, 335, 336, 337, 338, and 339 in FIG. 3B may be distinguished by three-dimensional directions, for example, $\theta$ and $\phi$ values in the spherical coordinate system, and transmission distances, by near field focusing. For example, the plurality of regions 331, 332, 333, 334, 335, 336, 337, 338, and 339 of FIG. 3B may be distinguished by directions (e.g., $\theta$ and $\phi$ values) in which power is transmitted from the wireless power transmission device 100 and transmission distances from the wireless power transmission device 100. For example, the wireless power transmission device 100 may transmit first power 341 for a first distance in a first direction toward a seventh region 337. The wireless power transmission device 100 may transmit second power 342 for a second distance in a second direction toward a fifth region 335. The wireless power transmission device 100 may transmit third power 343 for a third distance in a third direction toward a third region 333. Although nine regions are illustrated in FIG. 3B according to three directions and three distances, this is for convenience of description, and the number of the plurality of regions 331, 332, 333, 334, 335, 336, 337, 338, and 339 may be determined depending on the performance of the wireless power transmission device 100 (e.g., the number of directions in which power is transmitted and which are controllable by the wireless power transmission device 100, and transmission distances from the wireless power transmission device 100).

According to an embodiment, referring to FIG. 3, the wireless power transmission device 100 may divide the charging region into a plurality of regions (e.g., 311, 312, 313, and 314 of FIG. 3A and/or 331, 332, 333, 334, 335, 336, 337, 338, and 339 of FIG. 3B). The plurality of regions (e.g., 311, 312, 313, and 314 of FIG. 3A and/or 331, 332, 333, 334, 335, 336, 337, 338, and 339 of FIG. 3B) may be distinguished according to the performance of the wireless power transmission device 100 (e.g., the number of directions in which power is transmitted and which are controllable by the wireless power transmission device 100, and transmission distances from the wireless power transmission device 100) and/or an algorithm or program stored in the memory 230 of the wireless power transmission device 100.

According to an embodiment, the wireless power transmission device 100 may detect the presence or absence and stay duration of an object (e.g., the object 190 of FIGS. 1 and 2) in the plurality of divided regions (e.g., 311, 312, 313, and 314 of FIG. 3A and/or 331, 332, 333, 334, 335, 336, 337, 338, and 339 of FIG. 3B), respectively, included in the charging region. For example, the wireless power transmission device 100 may detect the presence or absence and stay duration of an object (e.g., the object 190 of FIGS. 1 and 2) in the plurality of divided regions (e.g., 311, 312, 313, and 314 of FIG. 3A and/or 331, 332, 333, 334, 335, 336, 337, 338, and 339 of FIG. 3B), respectively, by transmitting and receiving signals (e.g., radar signals) through the power processing circuit 260 every specified period, using the power processing circuit 260.

FIG. 4 is a flowchart illustrating a method of operating a wireless power transmission device according to an embodiment of the disclosure.

FIG. 4 will be described with reference to FIGS. 5A to 5C and 6.

Figures 5A, 5B, 5C:
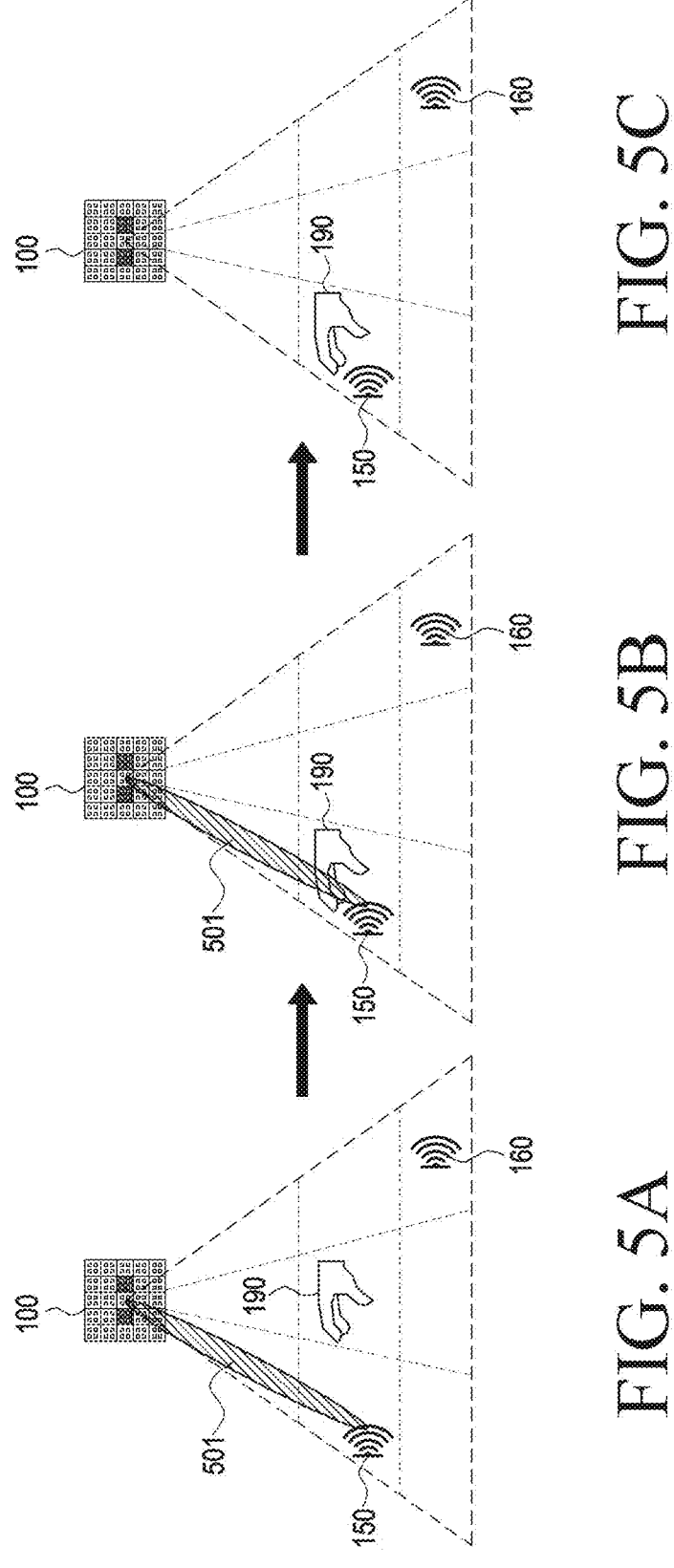
FIGS. 5A, 5B, and 5C are diagrams illustrating an operation of a wireless power transmission device according to an embodiment of the disclosure.

FIGS. 5A to 5C are diagrams illustrating an operation of a wireless power transmission device according to an embodiment of the disclosure.

FIGS. 6A to 6C are diagrams illustrating an operation of a wireless power transmission device according to an embodiment of the disclosure.

At least some of the operations of FIG. 4 may be omitted. The order of the operations of FIG. 4 may be changed. An operation other than the operations of FIG. 4 may be performed before, during, or after the operations of FIG. 4.

The embodiment of FIGS. 5A-5C and the embodiment of FIGS. 6A-6C may differ in terms of the method of performing operation 413 of FIG. 4. For operations 401, 403, 405, 407, 409, and 411 of FIG. 4, the embodiment of FIGS. 5A-5C and the embodiment of FIGS. 6A-6C may be similar. Therefore, for operations 401, 403, 405, 407, 409, and 411, the embodiment of FIGS. 5A-5C and the embodiment of FIGS. 6A-6C will be described together.

Referring to FIG. 4, according to an embodiment, the wireless power transmission device 100 (e.g., the processor 220) may transmit power to the first electronic device 150 disposed in the first region through a plurality of power transmission antennas 210 in operation 401. For example, referring to FIGS. 5A-5C or 6A-6C, the wireless power transmission device 100 may transmit first power 501 or 601 to the first electronic device 150 disposed in the first region. The wireless power transmission device 100 may control the power processing circuit 260 to transmit the first power 501 or 601 to the first electronic device 150 disposed in the first region among a plurality of regions (e.g., 311, 312, 313, and 314 of FIG. 3A and/or 331, 332, 333, 334, 335, 336, 337, 338, and 339 of FIG. 3B) included in the charging region of the wireless power transmission device 100 through the plurality of power transmission antennas 210. A method of transmitting power through the plurality of power transmission antennas 210 by controlling the power processing circuit 260 will be described later in more detail with reference to FIGS. 9, 10, and 11.

In operation 403, according to an embodiment, the wireless power transmission device 100 (e.g., the processor 220) may transmit at least one first signal using a first sensing antenna (e.g., 1070 in FIG. 10) among a plurality of sensing antennas 250. The wireless power transmission device 100 may transmit the at least one first signal using the first sensing antenna (e.g., 1070 in FIG. 10) among the plurality of sensing antennas 250 through the power processing circuit 260. The wireless power transmission device 100 may transmit the at least one first signal by applying at least one second RF signal of a second frequency to the first sensing antenna (e.g., 1070 in FIG. 10) among the plurality of sensing antennas 250 through the power processing circuit 260. The application of an RF signal through the power processing circuit 260 will be described later in more detail with reference to FIGS. 9, 10, and 11.

In operation 405, according to an embodiment, the wireless power transmission device 100 (e.g., the processor 220) may receive at least one second signal using a second sensing antenna (e.g., 1075 in FIG. 10) among the plurality of sensing antennas 250. The wireless power transmission device 100 may receive the at least one second signal using the second sensing antenna (e.g., 1075 in FIG. 10) among the plurality of sensing antennas 250 through the power processing circuit 260. The at least one second signal may be a signal in which the at least one first signal is reflected from an object (e.g., the object 190).

In operation 407, according to an embodiment, the wireless power transmission device 100 (e.g., the processor 220) may identify whether an object (e.g., the object 190) exists in the first region where the first electronic device 150 is located. For example, the wireless power transmission device 100 may identify whether an object (e.g., the object 190) exists in the first region where the first electronic device 150 is located, based on the at least one first signal of operation 403 and the at least one second signal of operation 405. For example, in FIG. 5A or FIG. 6A, the wireless power transmission device 100 may identify that an object (e.g., the object 190) does not exist in the first region where the first electronic device 150 is located. For example, in FIG. 5B or FIG. 6B, the wireless power transmission device 100 may identify that the object 190 exists in the first region where the first electronic device 150 is located.

In operation 409, according to an embodiment, the wireless power transmission device 100 (e.g., the processor 220) may identify a first stay duration during which the object 190 stays in the first region, based on identifying that the object 190 exists in the first region where the first electronic device 150 is located. For example, the wireless power transmission device 100 may transmit and receive signals (e.g., radar signals) through the power processing circuit 260 every specified period, using the sensing antenna 250. The wireless power transmission device 100 may perform operations 403 and 405 every specified period. For example, the wireless power transmission device 100 may identify the first stay duration during which the object 190 stays in the first region, based on the specified period in which operations 403 and 405 are performed and the number of times operations 403 and 405 are continuously performed. For example, the wireless power transmission device 100 may transmit the first signal of operation 403 every specified period, identify the number of times the second signal of operation 405 is continuously received, and identify the first stay duration during which the object 190 stays in the first region, based on the specified period and the number of times the second signal is continuously received. For example, the wireless power transmission device 100 may identify that the object 190 enters the first region at a first time point according to operations 403 and 405, and thus identify the number of times operations 403 and 405 are performed as 1. The wireless power transmission device 100 may then identify that the object 190 is located in the first region at a second time point after the specified period from the first time point according to operations 403 and 405, and thus identify that the number of times operations 403 and 405 are performed is 2 by adding 1 to the number of times they were performed. Thereafter, as operations 403 and 405 are performed continuously according to the specified period, that is, it is continuously identified that the object 190 is located in the first region every specified period, the wireless power transmission device 100 may identify that the object 190 continues to stay in the first region. Thereafter, the wireless power transmission device 100 may identify that the object 190 has left the first region, based on operation 403 being performed but the reflected signal of operation 405 not being received at a third time point. Accordingly, the wireless power transmission device 100 may identify the first stay duration during which the object 190 stays in the first region by multiplying the number of times operations 403 and 405 are performed by the specified period in which operations 403 and 405 are performed. The wireless power transmission device 100 may reset the number of times operations 403 and 405 are performed to 0 based on not receiving the reflected signal of operation 405 at the third time point. According to an embodiment, the wireless power transmission device 100 may update information about the first stay duration, which will be described later in more detail.

In operation 411, according to an embodiment, the wireless power transmission device 100 (e.g., the processor 220) may identify a first cumulative RF radiation value of the wireless power transmission device 100 for the first region during the first stay duration of operation 409. The wireless power transmission device 100 may identify the cumulative RF radiation value for the first region during the first stay duration according to the embodiment of FIG. 1. For example, the wireless power transmission device 100 may identify the cumulative RF radiation value for the first region during the first stay duration according to Equation 1.

Cumulative *RF* radiation value =          Equation 1

$$\frac{Power \times Tx\_Antenna\_Gain \times t \times n}{4\pi R^2}$$

In Equation 1, "Power" may be the magnitude of power transmitted from the wireless power transmission device 100. In Equation 1, "Tx_Antenna_Gain" may be an antenna gain of the wireless power transmission device 100 in the first region. In Equation 1, "t" may be a specified period in which operations 403 and 405 are performed. In Equation 1, "n" may be the number of times operations 403 and 405 are performed continuously. In Equation 1, "R" may be the distance from the wireless power transmission device 100 to the first region.

In operation 411, according to an embodiment, based on the first cumulative RF radiation value of operation 409 for the first region being equal to or greater than a first threshold for the first region, the wireless power transmission device 100 (e.g., the processor 220) may adjust the transmission output of power (e.g., 501 in FIGS. 5A-5C) for the first electronic device 150 in the first region, or control the power processing circuit 260 to direct power (e.g., 601 in FIGS. 6A and 6B) for the first electronic device 150 in the first region toward the second electronic device 160 in a second region different from the first region. The "threshold" may be a threshold for the cumulative RF radiation value (or a time average value of the cumulative RF radiation value) in a specific region (e.g., the first region). For example, the first threshold for the first region may be a threshold for a reference power exposure amount (e.g., the SAR and/or MPE reference) in the first region. For example, the wireless power transmission device 100 may identify the threshold according to Equation 2.

$$Threshold = MPE \text{ or } SAR \text{ limit} \times Average \text{ time} \times X\% \qquad Equation 2$$

In Equation 2, "MPE or SAR limit" may be the reference power exposure amount (e.g., the SAR and/or MPE reference). In Equation 2, the "Average time" may be an average time related to the reference power exposure amount (e.g., the SAR and/or MPE reference). The wireless power transmission device 100 may transmit power toward a specific region (e.g., the first region), while satisfying the reference power exposure amount. When the reference power exposure amount is exceeded, the wireless power transmission device 100 may be required to stop transmitting power toward the specific region (e.g., the first region). For example, when the "MPE or SAR limit" is exceeded during the "Average time", the wireless power transmission device 100 may be required to stop transmitting power toward the specific region (e.g., the first region). In Equation 2, "X" may be a threshold ratio set by the wireless power transmission device 100. For example, the threshold ratio X may be set respectively for the plurality of regions (e.g., 311, 312, 313, and 314 of FIG. 3A and/or 331, 332, 333, 334, 335, 336, 337, 338, and 339 of FIG. 3B) included in the charging region of the wireless power transmission device 100. The setting of the threshold ratio X will be described later in more detail with reference to FIGS. 7 and 8. As a result, the wireless power transmission device 100 may compare the first cumulative RF radiation value for the first region during the first stay duration, as identified by Equation 1, with the first threshold for the first region, as identified by Equation 2, and based on the first cumulative RF radiation value being equal to or greater than the first threshold as a result of the comparison, control the power processing circuit 260 to adjust the transmission output of power (e.g., 501 in FIGS. 5A and 5B) for the first electronic device 150 in the first region or to direct power (e.g., 601 in FIGS. 6A and 6B) for the first electronic device 150 in the first region toward the second electronic device 160 in the second region different from the first region.

For example, referring to FIGS. 5A-5C, the wireless power transmission device 100 may adjust the transmission output of power (e.g., 501 in FIGS. 5A and 5B) for the first electronic device 150 in the first region, based on the first cumulative RF radiation value in the first region during the first stay duration of the object 190 in the first region being equal to or greater than the first threshold for the first region. The operation of adjusting the transmission output of power may include lowering the transmission power of transmitted power, or stopping the transmission of power. For example, the wireless power transmission device 100 may control at least one amplifier of the power processing circuit 260 to adjust the transmission output of power.

For example, referring to FIGS. 6A-6C, the wireless power transmission device 100 may control the power processing circuit 260 to change the direction of the power 601 toward the first electronic device 150 in the first region, based on the first cumulative RF radiation value in the first region during the first stay duration of the object 190 in the first region being equal to or greater than the first threshold for the first region, so that the power 602 is transmitted toward the second electronic device 160 in the second region different from the first region. The transmission power of the power 602 directed toward the second electronic device 160 may be substantially the same as the transmission power of the power 601 directed toward the first electronic device 150. For example, the wireless power transmission device 100 may control at least one phase shifter of the power processing circuit 260 so that power toward the first electronic device 150 in the first region is directed to the second electronic device 160 in the second region different from the first region.

FIG. 7 is a flowchart illustrating a method of operating a wireless power transmission device according to an embodiment of the disclosure. FIG. 7 will be described with reference to FIG. 8.

FIG. 8 is a diagram illustrating an operation of a wireless power transmission device according to an embodiment of the disclosure.

At least some of the operations of FIG. 7 may be omitted. The order of the operations of FIG. 7 may be changed. An operation other than the operations of FIG. 7 may be performed before, during, or after the operations of FIG. 7. At least some of the operations of FIG. 7 may correspond to at least some of the operations of FIG. 4. The operations of FIG. 7 may be performed in organic conjunction with the operations of FIG. 4.

Referring to FIG. 7, according to an embodiment, the wireless power transmission device 100 (e.g., the processor 220) may identify reference information respectively for a plurality of regions (e.g., 311, 312, 313, and 314 of FIG. 3A and/or 331, 332, 333, 334, 335, 336, 337, 338, and 339 of FIG. 3B) included in a charging region of the wireless power transmission device 100 in operation 701. The "reference information" may include information about at least one of the direction of respective region with respect to the wireless power transmission device 100, the distance from the wireless power transmission device 100 to respective region, or a cumulative stay duration during which at least one object stays in respective region. The cumulative stay duration may be the sum of the stay duration of at least one object in respective region during a specified time period (e.g., one day, one week, or one month). For example, when a first object stays for a first time period and a second object stays for a second time period in the first region during a specified time period, the cumulative stay duration for the first region may be the sum of the first time period and the second time period. As the stay duration (e.g., the first stay duration) of a specific object (e.g., the object 190) in a specific region (e.g., the first region) is identified according to the operation of FIG. 4, the cumulative stay duration may be updated.

In operation 703, according to an embodiment, the wireless power transmission device 100 (e.g., the processor 220) may identify a threshold for a cumulative RF radiation value respectively for the plurality of regions included in the charging region. For example, the wireless power transmission device 100 may set a threshold ratio X respectively for the plurality of regions (e.g., 311, 312, 313, and 314 of FIG. 3A, and/or 331, 332, 333, 334, 335, 336, 337, 338, and 339 of FIG. 3B) included in the charging region. The threshold ratio X may be determined based on the cumulative stay duration of operation 701. The wireless power transmission device 100 may calculate a cumulative distribution function (CDF) respectively for the plurality of regions included in the charging region, based on a cumulative stay duration during a specified time period. For example, the wireless power transmission device 100 may calculate a CDF based on a cumulative stay duration in a specific region (e.g., the first region where the first electronic device 150 is located in FIGS. 1, 2, 3, 5, and 6) among the plurality of regions (e.g., 311, 312, 313, and 314 of FIG. 3A, and/or 331, 332, 333, 334, 335, 336, 337, 338, and 339 of FIG. 3B), as illustrated in FIG. 8. The wireless power transmission device 100 may set the threshold ratio X (e.g., the threshold ratio of Equation 2) respectively for the plurality of regions, based on the CDF of the cumulative stay duration for the plurality of regions, respectively, included in the charging region. The method of setting the threshold ratio is not limited. For example, the wireless power transmission device 100 may set the threshold ratio X respectively for the plurality of regions according to a ratio between a time when an object stays with a probability of 90% or higher in a corresponding region and a reference average time during which the human body is affected, based on the CDF of the cumulative stay duration for the plurality of regions respectively. The wireless power transmission device 100 may identify a threshold for the cumulative RF radiation value for the plurality of regions respectively, based on the threshold ratio for the plurality of regions respectively. The threshold for the cumulative RF radiation value may be calculated by Equation 2 described above. The threshold for the cumulative RF radiation value for the plurality of regions respectively in operation 703 may be used in operation 413 of FIG. 4.

In operation 705, according to an embodiment, the wireless power transmission device 100 (e.g., the processor 220) may update the threshold for the cumulative RF radiation value for the plurality of regions respectively. For example, based on the cumulative stay duration for the plurality of regions being updated respectively, the wireless power transmission device 100 may update the threshold for the cumulative RF radiation value for the plurality of regions respectively.

FIG. 9 is a diagram illustrating an orthogonal mode power feeding structure in a wireless power transmission device according to an embodiment of the disclosure.

Referring to FIG. 9, the wireless power transmission device 100 may include an orthogonal mode power feeding structure. The orthogonal mode power feeding structure of FIG. 9 may include a first substrate 901, a second substrate 902, a first port 911, a second port 912, a strip line 920 disposed between the first substrate 901 and the second substrate 902, and a wave guide 930. The first port 911 and the second port 912 may be ports through which an RF signal is input and output. A first RF signal of a first frequency and/or a second RF signal of a second frequency may be applied through the first port 911 and the second port 912. The strip line 920 may be a line for transmitting the first RF signal of the first frequency to a plurality of power transmission antennas 210. For example, the first RF signal of the first frequency may be input to the first port 911, flow through the strip line 920 disposed between the first substrate 901 and the second substrate 902, and output to the second port 912. The wave guide 930 may be a guide for transmitting the second RF signal of the second frequency to a plurality of sensing antennas 250. The wave guide 930 may be a structure in which cylindrical conductors are arranged continuously at regular intervals across the first substrate 901 and the second substrate 902. For example, the second RF signal of the second frequency may be input to the first port 911, propagated within a space formed by the wave guide 930, and output to the second port 912. When a plurality of orthogonal mode feeding structures of FIG. 9 are arranged continuously, the first RF signal of the first frequency may be transmitted through the strip line 920, and the second RF signal of the second frequency different from the first frequency may be transmitted through the space formed by the wave guide 930. Based on the orthogonal mode power feeding structure of FIG. 9, the first RF signal of the first frequency transmitted through the strip line 920 and the second RF signal of the second frequency transmitted through the space formed by the wave guide 930 may be orthogonal to each other. Therefore, based on the orthogonal mode power feeding structure of FIG. 9, the first RF signal of the first frequency transmitted through the strip line 920 and the second RF signal of the second frequency transmitted through the space formed by the wave guide 930 may operate independently of each other. Accordingly, the wireless power transmission device 100 (e.g., the processor 220) may control the power processing circuit 260 to simultaneously apply the first RF signal of the first frequency (e.g., an RF signal applied to the power transmission antenna 210 through the strip line 920 of FIG. 9) and the second RF signal of the second frequency (e.g., an RF signal propagated through the space formed by the wave guide 930 of FIG. 9).

FIG. 10 is a diagram illustrating a power transmission antenna and a sensing antenna in a wireless power transmission device according to an embodiment of the disclosure.

Referring to FIG. 10, a plurality of power transmission antennas 210 and a plurality of sensing antennas 250 in the wireless power transmission device 100 of FIGS. 1 to 9 may be described. However, the arrangement of the antennas in FIG. 10 is and the arrangement of the plurality of antennas included in the wireless power transmission device 100 is not limited to the embodiment of FIG. 10.

Referring to FIG. 10, the wireless power transmission device 100 may include a 1A antenna 1011. 1 of "1A" may represent a first row. A of "1A" may represent a first column. Therefore, the 1A antenna 1011 may be an antenna disposed in the first row and the first column.

In FIG. 10, the wireless power transmission device 100 may include the 1A antenna 1011, a 1B antenna 1012, a 1C antenna 1013, a 1D antenna 1013, a 1E antenna 1015, a 2A antenna 1021, a 2B antenna 1022, a 2C antenna 1023, a 2D antenna 1023, a 2E antenna 1025, a 3A antenna 1031, a 3B antenna 1032, a 3C antenna 1033, a 3D antenna 1034, a 3E antenna 1035, a 4A antenna 1041, a 4B antenna 1042, a 4C antenna 1043, a 4D antenna 1043, a 4E antenna 1045, a 5A antenna 1051, a 5B antenna 1052, a 5C antenna 1053, a 5D antenna 1053, and a 5E antenna 1055.

Among these antennas, except for the 3B antenna 1032 and the 3D antenna 1034, the 1A antenna 1011, the 1B antenna 1012, the 1C antenna 1013, the 1D antenna 1013, the 1E antenna 1015, the 2A antenna 1021, the 2B antenna 1022, the 2C antenna 1023, the 2D antenna 1023, the 2E antenna 1025, the 3A antenna 1031, the 3C antenna 1033, the 3E antenna 1035, the 4A antenna 1041, the 4B antenna 1042, the 4C antenna 1043, the 4D antenna 1043, the 4E antenna 1045, the 5A antenna 1051, the 5B antenna 1052, the 5C antenna 1053, the 5D antenna 1053 and the 5E antenna 1055 may include only patch antennas, which are power transmission antennas 210. For example, the 1A antenna 1011 may include a first patch antenna 1016, a second patch antenna 1017, a third patch antenna 1018, and a fourth patch antenna 1019. The first patch antenna 1016, the second patch antenna 1017, the third patch antenna 1018, and the fourth patch antenna 1019 may be arranged in a grid structure.

The 3B antenna 1032 and the 3D antenna 1034 may include both a patch antenna as a power transmission antenna 210, and a slot antenna as a sensing antenna 250. For example, the 3B antenna 1032 may include both a power transmission antenna 1060 and a sensing antenna 1070. For example, the 3B antenna 1032 may include the orthogonal mode power feeding structure of FIG. 9.

For example, the power transmission antenna 1060 of the 3B antenna 1032 may include a fifth patch antenna 1061, a sixth patch antenna 1062, a seventh patch antenna 1063, and an eighth patch antenna 1064. The fifth patch antenna 1061, the sixth patch antenna 1062, the seventh patch antenna 1063, and the eighth patch antenna 1064 may be arranged in a grid structure. A strip line may be connected to the patch antennas. For example, in FIG. 10, a strip line 1080 may be connected to the fifth patch antenna 1061, the sixth patch antenna 1062, the seventh patch antenna 1063, and the eighth patch antenna 1064. Referring to FIG. 10, it may be seen that the strip line 1080 is extended in an "H" shape and connected to the fifth patch antenna 1061, the sixth patch antenna 1062, the seventh patch antenna 1063, and the eighth patch antenna 1064. The fifth patch antenna 1061, the sixth patch antenna 1062, the seventh patch antenna 1063, and the eighth patch antenna 1064 may operate based on the first RF signal of the first frequency transmitted through the strip line 1080.

For example, the sensing antenna 1070 of the 3B antenna 1032 may include a first slot antenna 1071, a second slot antenna 1072, a third slot antenna 1073, and a fourth slot antenna 1074. Referring to FIG. 10, when viewed from above, the first slot antenna 1071, the second slot antenna 1072, the third slot antenna 1073, and the fourth slot antenna 1074 may be arranged around the strip line 1080 (e.g., the strip line 920 of FIG. 9) in a space formed by a wave guide 1090 (e.g., the wave guide 930 of FIG. 9). The first slot antenna 1071, the second slot antenna 1072, the third slot antenna 1073, and the fourth slot antenna 1074 may operate based on the second RF signal of the second frequency propagated through the space formed by the wave guide 1090 (e.g., the wave guide 930 of FIG. 9).

For example, the 3D antenna 1034 may include both a power transmission antenna 1065 and a sensing antenna 1075. The 3D antenna 1034 may be understood as similar to the 3B antenna 1032.

According to an embodiment, the wireless power transmission device 100 (e.g., the processor 220) may control the power processing circuit 260 to simultaneously apply the first RF signal of the first frequency (e.g., an RF signal applied to the power transmission antenna 210 through the strip line 920 of FIG. 9 or the strip line 1080 of FIG. 10) and the second RF signal of the second frequency (e.g., an RF signal propagating through the space formed by the wave guide 930 of FIG. 9 or the wave guide 1090 of FIG. 10).

FIG. 11 is a diagram illustrating an antenna structure in a wireless power transmission device according to an embodiment of the disclosure.

Referring to FIG. 11, the vertical structure of the 3B antenna 1032 of FIG. 10 may be described.

For example, referring to FIG. 11, the 3B antenna 1032 of FIG. 10 may include a first substrate 1101, a first adhesive surface 1111, a second substrate 1102, a second adhesive surface 1112, and a third substrate 1103. A patch antenna 1130 (e.g., one of the fifth patch antenna 1061, the sixth patch antenna 1062, the seventh patch antenna 1063, and the eighth patch antenna 1064 of FIG. 10) may be disposed on the first substrate 1101. A first surface 1141 including a patch ground and a slot array (e.g., the first slot antenna 1071, the second slot antenna 1072, the third slot antenna 1073, and the fourth slot antenna 1074 of FIG. 10) may be formed on the second substrate 1102. A second surface 1142 including a strip line (e.g., the strip line 1080 of FIG. 10) may be formed on the third substrate 1103. A third surface 1143 including a ground may be formed under the third substrate 1103. A wave guide 1150 (e.g., the wave guide 1090 of FIG. 10) may be formed, in which cylindrical conductors are arranged at regular intervals across the first substrate 1101, the second substrate 1102, and the third substrate 1103.

FIG. 12 is a diagram illustrating an operation of an orthogonal mode power feeding structure in a wireless power transmission device according to an embodiment of the disclosure.

FIG. 13 is a diagram illustrating a radiation pattern of a wireless power transmission device according to an embodiment of the disclosure.

FIG. 14 is a graph illustrating reflection coefficients of a wireless power transmission device according to an embodiment of the disclosure.

FIG. 15 is a diagram illustrating an operation of an orthogonal mode power feeding structure in a wireless power transmission device according to an embodiment of the disclosure.

FIG. 16 is a diagram illustrating a radiation pattern of a wireless power transmission device according to an embodiment of the disclosure.

FIG. 17 is a graph illustrating reflection coefficients of a wireless power transmission device according to an embodiment of the disclosure.

FIGS. 15, 16, and 17 are diagrams illustrating an embodiment in which the first RF signal of the first frequency is applied through the orthogonal mode power feeding structure of FIG. 9 or 10. FIGS. 12, 13, and 14 are diagrams illustrating an embodiment in which the second RF signal of the second frequency is applied through the orthogonal mode feeding structure of FIG. 9 or 10. It may be described that the first RF signal of the first frequency and the second RF signal of the second frequency may be applied simultaneously by comparing the embodiment in which the first RF signal of the first frequency is applied and the embodiment in which the second RF signal of the second frequency is applied.

FIG. 12 is a diagram illustrating an electric field formed around the first slot antenna 1071, the second slot antenna 1072, the third slot antenna 1073, the fourth slot antenna 1074, and the strip line 1080, when the second RF signal of the second frequency is propagated through the space formed by the wave guide 1090. Referring to FIG. 12, it may be identified that as the second RF signal of the second frequency is propagated through the space formed by the wave guide 1090, a relatively strong electric field is formed around the first slot antenna 1071, the second slot antenna 1072, the third slot antenna 1073, and the fourth slot antenna 1074, and a relatively weak electric field is formed around the strip line 1080 (e.g., portions where the strip line 1080 is connected in an "H" shape). Referring to the reflection coefficients of the orthogonal mode power feeding structure in FIG. 14, it may be identified that the operating performance at the second frequency (e.g., 60 GHZ) satisfies a reference (e.g., −10 dB).

FIG. 15 is a diagram illustrating an electric field formed around the strip line 1080, when the first RF signal of the first frequency is applied through the strip line 1080.

Referring to FIG. 15, it may be identified that an electric field is formed around the strip line 1080, as the first RF signal of the first frequency is applied through the strip line 1080. It may be identified that no noticeable electric field is formed around the first slot antenna 1071, the second slot antenna 1072, the third slot antenna 1073, and the fourth slot antenna 1074, when the first RF signal of the first frequency is applied through the strip line 1080. Referring to the reflection coefficients of the orthogonal mode power feeding structure in FIG. 17, it may be identified that the operating performance at the first frequency (e.g., 24 GHZ) satisfies the reference (e.g., −10 dB).

Referring to FIGS. 12 and 15, it may be identified that the power transmission antennas 210 and the sensing antennas 250 included in the wireless power transmission device 100 operate independently at the first frequency and the second frequency, respectively, based on the orthogonal mode power feeding structure of FIG. 9 or 10. In a first radiation pattern of FIG. 13 corresponding to FIG. 12, and a second radiation pattern of FIG. 16 corresponding to FIG. 15, it may be identified that there is a high gain without interference between radiators.

Those skilled in the art will understand that the embodiments of the disclosure may be applied organically with each other within an applicable scope. For example, those skilled in the art will understand that at least some operations of an embodiment of the disclosure may be omitted, and at least some operations of an embodiment and at least some operations of another embodiment may be applied in organic conjunction with each other.

According to an embodiment, the wireless power transmission device 100 may include the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130, the plurality of sensing antennas 250, 1070, 1071, 1072, 1073, 1074, and 1075, the power processing circuit 260, and the processor 220. The processor 220 may be configured to control the power processing circuit 260 to transmit power to the first electronic device 150 disposed in a first region among the plurality of regions 311, 312, 313, 314, 331, 332, 333, 334, 335, 336, 337, 338, and 339 included in a charging region of the wireless power transmission device 100 through the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130. The processor 220 may be configured to transmit at least one first signal through the power processing circuit 260, using the first sensing antenna 1070 among the plurality of sensing antennas 250, 1070, 1071, 1072, 1073, 1074, and 1075. The processor 220 may be configured to receive at least one second signal through the power processing circuit 260, using the second sensing antenna 1075 among the plurality of sensing antennas 250, 1070, 1071, 1072, 1073, 1074, and 1075. The processor 220 may be configured to identify whether the object 190 exists in the first region among the plurality of regions 311, 312, 313, 314, 331, 332, 333, 334, 335, 336, 337, 338, and 339, based on the at least one first signal and the at least one second signal. The processor 220 may be configured to identify a first stay duration during which the object 190 stays in the first region, based on identifying that the object 190 exists in the first region. The processor 220 may be configured to identify a first cumulative RF radiation value of the wireless power transmission device 100 for the first region during the first stay duration. The processor 220 may be configured to, based on the first cumulative RF radiation value being equal to or greater than a first threshold for the first region, control the power processing circuit 260 to adjust transmission output of the power to the first electronic device 150 in the first region or to direct the power toward the first electronic device 150 in the first region to a second electronic device in a second region different from the first region.

According to an embodiment, the processor 220 may be configured to identify the first stay duration during which the object 190 stays in the first region by transmitting the at least one first signal every specified period.

According to an embodiment, the processor 220 may be configured to identify the first stay duration during which the object 190 stays in the first region, based on the number of times the at least one second signal is continuously received and the specified period.

According to an embodiment, the processor 220 may be configured to identify a threshold for a cumulative RF radiation value respectively for the plurality of regions 311, 312, 313, 314, 331, 332, 333, 334, 335, 336, 337, 338, and 339 included in the charging region.

According to an embodiment, the processor 220 may be configured to identify the threshold based on a cumulative stay duration of at least one object 190 for the plurality of regions 311, 312, 313, 314, 331, 332, 333, 334, 335, 336, 337, 338, and 339 respectively.

According to an embodiment, the processor 220 may be configured to update the threshold for the plurality of regions 311, 312, 313, 314, 331, 332, 333, 334, 335, 336, 337, 338, and 339 respectively, as the cumulative stay duration for the plurality of regions 311, 312, 313, 314, 331, 332, 333, 334, 335, 336, 337, 338, and 339 is updated respectively.

According to an embodiment, the processor 220 may be configured to control at least one amplifier of the power processing circuit 260 to adjust the transmission output of the power to the first electronic device 150 in the first region, based on the first cumulative RF radiation value being equal to or greater than the first threshold for the first region.

According to an embodiment, the processor 220 may be configured to control at least one phase shifter of the power processing circuit 260 to direct the power toward the first electronic device 150 in the first region to the second electronic device in the second region different from the first region, based on the first cumulative RF radiation value being equal to or greater than the first threshold for the first region.

According to an embodiment, the wireless power transmission device 100 may include the strip line 920 or 1080 for transmitting a first RF signal of a first frequency to the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130 in the power processing circuit 260. The wireless power transmission device may include the wave guide 930 or 1090 for transmitting a second RF signal of a second frequency to the plurality of sensing antennas 250, 1070, 1071, 1072, 1073, 1074, and 1075 in the power processing circuit 260.

According to an embodiment, the processor 220 may be configured to control the power processing circuit 260 to simultaneously apply the first RF signal and the second RF signal.

According to an embodiment, a method of operating the wireless power transmission device 100 may include controlling the power processing circuit 260 of the wireless power transmission device 100 to transmit power to the first electronic device 150 disposed in a first region among the plurality of regions 311, 312, 313, 314, 331, 332, 333, 334, 335, 336, 337, 338, and 339 included in a charging region of the wireless power transmission device 100 through the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130 of the wireless power transmission device 100. The method may include transmitting at least one first signal through the power processing circuit 260, using the first sensing antenna 1070 among the plurality of sensing antennas 250, 1070, 1071, 1072, 1073, 1074, and 1075 of the wireless power transmission device 100. The method may include receiving at least one second signal through the power processing circuit 260, using the second sensing antenna 1075 among the plurality of sensing antennas 250, 1070, 1071, 1072, 1073, 1074, and 1075. The method may include identifying whether the object 190 exists in the first region among the plurality of regions 311, 312, 313, 314, 331, 332, 333, 334, 335, 336, 337, 338, and 339, based on the at least one first signal and the at least one second signal. The method may include identifying a first stay duration during which the object 190 stays in the first region, based on identifying that the object 190 exists in the first region. The method may include identifying a first cumulative RF radiation value of the wireless power transmission device 100 for the first region during the first stay duration. The method may include, based on the first cumulative RF radiation value being equal to or greater than a first threshold for the first region, controlling the power processing circuit 260 to adjust transmission output of the power to the first electronic device 150 in the first region or to direct the power toward the first electronic device 150 in the first region to a second electronic device in a second region different from the first region.

According to an embodiment, identifying the first stay duration during which the object 190 stays in the first region may include identifying the first stay duration during which the object 190 stays in the first region by transmitting the at least one first signal every specified period.

According to an embodiment, identifying the first stay duration during which the object 190 stays in the first region may include identifying the first stay duration during which the object 190 stays in the first region, based on the number of times the at least one second signal is continuously received and the specified period.

According to an embodiment, the method may include identifying a threshold for a cumulative RF radiation value respectively for the plurality of regions 311, 312, 313, 314, 331, 332, 333, 334, 335, 336, 337, 338, and 339 included in the charging region.

According to an embodiment, identifying the threshold for the plurality of regions 311, 312, 313, 314, 331, 332, 333, 334, 335, 336, 337, 338, and 339 respectively may include identifying the threshold based on a cumulative stay duration of at least one object 190 for the plurality of regions 311, 312, 313, 314, 331, 332, 333, 334, 335, 336, 337, 338, and 339 respectively.

According to an embodiment, the method may include updating the threshold for the plurality of regions 311, 312, 313, 314, 331, 332, 333, 334, 335, 336, 337, 338, and 339 respectively, as the cumulative stay duration for the plurality of regions 311, 312, 313, 314, 331, 332, 333, 334, 335, 336, 337, 338, and 339 is updated respectively.

According to an embodiment, controlling the power processing circuit 260 based on the first cumulative RF radiation value being equal to or greater than the first threshold for the first region may include controlling at least one amplifier of the power processing circuit 260 to adjust the transmission output of the power to the first electronic device 150 in the first region, based on the first cumulative RF radiation value being equal to or greater than the first threshold for the first region.

According to an embodiment, controlling the power processing circuit 260 based on the first cumulative RF radiation value being equal to or greater than the first threshold for the first region may include controlling at least one phase shifter of the power processing circuit 260 to direct the power toward the first electronic device 150 in the first region to the second electronic device in the second region different from the first region, based on the first cumulative RF radiation value being equal to or greater than the first threshold for the first region.

According to an embodiment, the wireless power transmission device 100 may include the strip line 920 or 1080 for transmitting a first RF signal of a first frequency to the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130 in the power processing circuit 260. The wireless power transmission device 100 may include the wave guide 930 or 1090 for transmitting a second RF signal of a second frequency to the plurality of sensing antennas 250, 1070, 1071, 1072, 1073, 1074, and 1075 in the power processing circuit 260.

According to an embodiment, the method may include controlling the power processing circuit 260 to simultaneously apply the first RF signal and the second RF signal.

According to an embodiment, in a computer-readable recording medium storing instructions configured to enable the processor 220 of the wireless power transmission device 100 to perform at least one operation, the at least one operation may include controlling the power processing circuit 260 of the wireless power transmission device 100 to transmit power to the first electronic device 150 disposed in a first region among the plurality of regions 311, 312, 313, 314, 331, 332, 333, 334, 335, 336, 337, 338, and 339 included in a charging region of the wireless power transmission device 100 through the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130 of the wireless power transmission device 100. The at least one operation may include transmitting at least one first signal through the power processing circuit 260, using the first sensing antenna 1070 among the plurality of sensing antennas 250, 1070, 1071, 1072, 1073, 1074, and 1075 of the wireless power transmission device 100. The at least one operation may include receiving at least one second signal through the power processing circuit 260, using the second sensing antenna 1075 among the plurality of sensing antennas 250, 1070, 1071, 1072, 1073, 1074, and 1075. The at least one operation may include identifying whether the object 190 exists in the first region among the plurality of regions 311, 312, 313, 314, 331, 332, 333, 334, 335, 336, 337, 338, and 339, based on the at least one first signal and the at least one second signal. The at least one operation may include identifying a first stay duration during which the object 190 stays in the first region, based on identifying that the object 190 exists in the first region. The at least one operation may include identifying a first cumulative RF radiation value of the wireless power transmission device 100 for the first region during the first stay duration. The at least one operation may include, based on the first cumulative RF radiation value being equal to or greater than a first threshold for the first region, controlling the power processing circuit 260 to adjust transmission output of the power to the first electronic device 150 in the first region or to direct the power toward the first electronic device 150 in the first region to a second electronic device in a second region different from the first region.

According to an embodiment, identifying the first stay duration during which the object 190 stays in the first region may include identifying the first stay duration during which the object 190 stays in the first region by transmitting the at least one first signal every specified period.

According to an embodiment, identifying the first stay duration during which the object 190 stays in the first region may include identifying the first stay duration during which the object 190 stays in the first region, based on the number of times the at least one second signal is continuously received and the specified period.

According to an embodiment, the at least one operation may include identifying a threshold for a cumulative RF radiation value respectively for the plurality of regions 311, 312, 313, 314, 331, 332, 333, 334, 335, 336, 337, 338, and 339 included in the charging region.

According to an embodiment, identifying the threshold for the plurality of regions 311, 312, 313, 314, 331, 332, 333, 334, 335, 336, 337, 338, and 339 respectively may include identifying the threshold based on a cumulative stay duration of at least one object 190 for the plurality of regions 311, 312, 313, 314, 331, 332, 333, 334, 335, 336, 337, 338, and 339 respectively.

According to an embodiment, the at least one operation may include updating the threshold for the plurality of regions 311, 312, 313, 314, 331, 332, 333, 334, 335, 336, 337, 338, and 339 respectively, as the cumulative stay duration for the plurality of regions 311, 312, 313, 314, 331, 332, 333, 334, 335, 336, 337, 338, and 339 is updated respectively.

According to an embodiment, controlling the power processing circuit 260 based on the first cumulative RF radiation value being equal to or greater than the first threshold for the first region may include controlling at least one amplifier of the power processing circuit 260 to adjust the transmission output of the power to the first electronic device 150 in the first region, based on the first cumulative RF radiation value being equal to or greater than the first threshold for the first region.

According to an embodiment, controlling the power processing circuit 260 based on the first cumulative RF radiation value being equal to or greater than the first threshold for the first region may include controlling at least one phase shifter of the power processing circuit 260 to direct the power toward the first electronic device 150 in the first region to the second electronic device in the second region different from the first region, based on the first cumulative RF radiation value being equal to or greater than the first threshold for the first region.

According to an embodiment, the wireless power transmission device 100 may include the strip line 920 or 1080 for transmitting a first RF signal of a first frequency to the plurality of power transmission antennas 210, 1130, 1011, 1012, 1013, 1014, 1015, 1016, 1017, 1018, 1019, 1021, 1022, 1023, 1024, 1025, 1031, 1032, 1033, 1034, 1035, 1041, 1042, 1043, 1044, 1045, 1051, 1052, 1053, 1054, 1055, 1060, 1061, 1062, 1063, 1064, and 1130 in the power processing circuit 260. The wireless power transmission device 100 may include the wave guide 930 or 1090 for transmitting a second RF signal of a second frequency to the plurality of sensing antennas 250, 1070, 1071, 1072, 1073, 1074, and 1075 in the power processing circuit 260.

According to an embodiment, the at least one operation may include controlling the power processing circuit 260 to simultaneously apply the first RF signal and the second RF signal.

The electronic device according to embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., a program) including one or more instructions that are stored in a storage medium (e.g., internal memory or external memory) that is readable by a machine (e.g., the wireless power transmission device 100). For example, a processor (e.g., the processor 220) of the machine (e.g., the wireless power transmission device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device comprising:
a plurality of power transmission antennas;
a plurality of sensing antennas;
a power processing circuit;
memory storing one or more computer programs; and
one or more processors communicatively coupled to the plurality of power transmission antennas, the plurality of sensing antennas, the power processing circuit, and the memory,
wherein the one or more computer programs include computer-executable instructions that, when executed by the one or more processors individually or collectively, cause the wireless power transmission device to:
control the power processing circuit to transmit power to a first electronic device disposed in a first region among a plurality of regions included in a charging region of the wireless power transmission device (100) through the plurality of power transmission antennas,
transmit at least one first signal through the power processing circuit, using a first sensing antenna among the plurality of sensing antennas,
receive at least one second signal through the power processing circuit, using a second sensing antenna among the plurality of sensing antennas,
identify whether an object exists in the first region among the plurality of regions, based on the at least one first signal and the at least one second signal,
identify a first stay duration during which the object stays in the first region, based on identifying that the object exists in the first region,
identify a first cumulative radio frequency (RF) radiation value of the wireless power transmission device for the first region during the first stay duration, and
based on the first cumulative RF radiation value being equal to or greater than a first threshold for the first region, control the power processing circuit to adjust transmission output of the power to the first electronic device in the first region or to direct the power toward the first electronic device in the first region to a second electronic device in a second region different from the first region.

2. The wireless power transmission device of claim 1, wherein the one or more computer programs further include computer-executable instructions that, when executed by the one or more processors individually or collectively, cause the wireless power transmission device to identify the first stay duration during which the object stays in the first region by transmitting the at least one first signal every specified period.

3. The wireless power transmission device of claim 2, wherein the one or more computer programs further include computer-executable instructions that, when executed by the one or more processors individually or collectively, cause the wireless power transmission device to identify the first stay duration during which the object stays in the first region, based on a number of times the at least one second signal is continuously received and the specified period.

4. The wireless power transmission device of claim 1, wherein the one or more computer programs further include computer-executable instructions that, when executed by the one or more processors individually or collectively, cause the wireless power transmission device to identify a threshold for a cumulative RF radiation value respectively for the plurality of regions included in the charging region.

5. The wireless power transmission device of claim 4, wherein the one or more computer programs further include computer-executable instructions that, when executed by the one or more processors individually or collectively, cause the wireless power transmission device to identify the threshold based on a cumulative stay duration of at least one object respectively for the plurality of regions.

6. The wireless power transmission device of claim 5, wherein the one or more computer programs further include computer-executable instructions that, when executed by the one or more processors individually or collectively, cause the wireless power transmission device to update the threshold respectively for the plurality of regions, as the cumulative stay duration respectively for the plurality of regions is updated.

7. The wireless power transmission device of claim 1, wherein the one or more computer programs further include computer-executable instructions that, when executed by the one or more processors individually or collectively, cause the wireless power transmission device to control at least one amplifier of the power processing circuit to adjust the transmission output of the power to the first electronic device in the first region, based on the first cumulative RF radiation value being equal to or greater than the first threshold for the first region.

8. The wireless power transmission device of claim 1, wherein the one or more computer programs further include computer-executable instructions that, when executed by the one or more processors individually or collectively, cause the wireless power transmission device to control at least one phase shifter of the power processing circuit to direct the power toward the first electronic device in the first region to the second electronic device in the second region different from the first region, based on the first cumulative RF radiation value being equal to or greater than the first threshold for the first region.

9. The wireless power transmission device of claim 1, further comprising:

a strip line configured to transmit a first RF signal of a first frequency to the plurality of power transmission antennas in the power processing circuit; and a wave guide configured to transmit a second RF signal of a second frequency to the plurality of sensing antennas in the power processing circuit.

10. The wireless power transmission device of claim 9, wherein the one or more computer programs further include computer-executable instructions that, when executed by the one or more processors individually or collectively, cause the wireless power transmission device to control the power processing circuit to simultaneously apply the first RF signal and the second RF signal.

11. A method of operating a wireless power transmission device, the method comprising:

controlling a power processing circuit of the wireless power transmission device to transmit power to a first electronic device disposed in a first region among a plurality of included in a charging region of the wireless power transmission device (100) through a plurality of power transmission antennas of the wireless power transmission device;

transmitting at least one first signal through the power processing circuit, using a first sensing antenna among a plurality of sensing antennas of the wireless power transmission device;

receiving at least one second signal through the power processing circuit, using a second sensing antenna among the plurality of sensing antennas;

identifying whether an object exists in the first region among the plurality of regions, based on the at least one first signal and the at least one second signal;

identifying a first stay duration during which the object stays in the first region, based on identifying that the object exists in the first region;

identifying a first cumulative RF radiation value of the wireless power transmission device for the first region during the first stay duration; and based on the first cumulative RF radiation value being equal to or greater than a first threshold for the first region, controlling the power processing circuit to adjust transmission output of the power to the first electronic device in the first region or to direct the power toward the first electronic device in the first region to a second electronic device in a second region different from the first region.

12. The method of claim 11, wherein identifying the first stay duration during which the object stays in the first region includes identifying the first stay duration during which the object stays in the first region by transmitting the at least one first signal every specified period.

13. The method of claim 12, wherein identifying the first stay duration during which the object stays in the first region includes identifying the first stay duration during which the object stays in the first region, based on a number of times the at least one second signal is continuously received and the specified period.

14. The method of claim 11, further comprising:

identifying a threshold for a cumulative RF radiation value respectively for the plurality of regions included in the charging region.

15. The method of claim 14, wherein identifying the threshold respectively for the plurality of regions includes identifying the threshold based on a cumulative stay duration of at least one object respectively for the plurality of.

16. The method of claim 15, further comprising updating the threshold respectively for the plurality of regions, as the cumulative stay duration respectively for the plurality of regions.

17. The method of claim 11, further comprising controlling at least one amplifier of the power processing circuit to adjust the transmission output of the power to the first electronic device in the first region, based on the first cumulative RF radiation value being equal to or greater than the first threshold for the first region.

18. The method of claim 11, further comprising controlling at least one phase shifter of the power processing circuit to direct the power toward the first electronic device in the first region to the second electronic device in the second region different from the first region, based on the first cumulative RF radiation value being equal to or greater than the first threshold for the first region.

19. One or more non-transitory computer-readable storage media storing one or more computer programs including computer-executable instructions that, when executed by one or more processors of a wireless power transmission device individually or collectively, cause the wireless power transmission device to perform operations, the operations comprising:

controlling a power processing circuit of the wireless power transmission device to transmit power to a first electronic device disposed in a first region among a plurality of included in a charging region of the wireless power transmission device (100) through a plurality of power transmission antennas of the wireless power transmission device;

transmitting at least one first signal through the power processing circuit, using a first sensing antenna among a plurality of sensing antennas of the wireless power transmission device;

receiving at least one second signal through the power processing circuit, using a second sensing antenna among the plurality of sensing antennas;

identifying whether an object exists in the first region among the plurality of regions, based on the at least one first signal and the at least one second signal;

identifying a first stay duration during which the object stays in the first region, based on identifying that the object exists in the first region;

identifying a first cumulative RF radiation value of the wireless power transmission device for the first region during the first stay duration; and based on the first cumulative RF radiation value being equal to or greater than a first threshold for the first region, controlling the power processing circuit to adjust transmission output of the power to the first electronic device in the first region or to direct the power toward the first electronic device in the first region to a second electronic device in a second region different from the first region.

20. The one or more non-transitory computer-readable storage media of claim 19, the operations further comprising identifying a threshold for a cumulative RF radiation value respectively for the plurality of regions included in the charging region.

* * * * *